(12) United States Patent
Smith et al.

(10) Patent No.: US 9,692,523 B2
(45) Date of Patent: Jun. 27, 2017

(54) ELECTRONIC QUANTUM INFORMATION PROBABILITY TRANSFER

(71) Applicant: The Boeing Company, Chicago, IL (US)

(72) Inventors: Shawn Michael Smith, Bear, DE (US); Claudio G. Parazzoli, Seattle, WA (US); Barbara A. Capron, Sammamish, WA (US); Shahriar Khosravani, Everett, WA (US); Michael C. Freebery, Hockessin, DE (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/413,014

(22) Filed: Jan. 23, 2017

(65) Prior Publication Data
US 2017/0134100 A1     May 11, 2017

Related U.S. Application Data

(63) Continuation of application No. 15/203,511, filed on Jul. 6, 2016, now Pat. No. 9,571,207, which is a
(Continued)

(51) Int. Cl.
*H04B 10/00*     (2013.01)
*H04B 10/90*     (2013.01)
(Continued)

(52) U.S. Cl.
CPC ............ *H04B 10/90* (2013.01); *H04B 10/70* (2013.01)

(58) Field of Classification Search
CPC .............................. H04B 10/30; H04B 10/70
See application file for complete search history.

(56) References Cited

U.S. PATENT DOCUMENTS

| | | | | |
|---|---|---|---|---|
| 2005/0006593 | A1* | 1/2005 | Kastella | H04B 10/70 250/458.1 |
| 2006/0056631 | A1* | 3/2006 | Beausoleil | B82Y 10/00 380/256 |
| 2014/0099104 | A1* | 4/2014 | Peters | H04B 10/70 398/25 |

OTHER PUBLICATIONS

O. Cohen, "Counterfactual Entanglement and Nonlocal Correlations in Separable States," Physical Review A, vol. 60, No. 1, pp. 80-84, Jul. 1999.
(Continued)

*Primary Examiner* — Daniel Dobson
(74) *Attorney, Agent, or Firm* — DASCENZO Intellectual Property Law, P.C.

(57) ABSTRACT

Methods of digital communication utilizing entangled qubits are disclosed. The communication methods exploit selective entanglement swapping to transfer an entangled state between a sending device and a receiving device. Each device includes pairs of qubits that are independently entangled with pairs of qubits in the other device. By selectively entangling the qubits within a pair in the sending device, the qubits of the corresponding pair in the receiving device also are selectively entangled. When the qubits are entangled, they are projected onto a particular entangled state type. Though no information may be transferred through selective entanglement of one qubit pair, the disclosed methods determine whether a set of pairs of qubits are entangled by determining whether the distribution of pairs is a correlated or uncorrelated distribution (a probabilistic approach) and transform the distribution type to a classical bit of data to transfer classical bits in a qubit-efficient approach.

20 Claims, 3 Drawing Sheets

Related U.S. Application Data continuation of application No. 14/642,514, filed on Mar. 9, 2015, now Pat. No. 9,413,470.

(51) Int. Cl.
*H04B 10/70* (2013.01)
*H04J 14/00* (2006.01)

(56) References Cited

OTHER PUBLICATIONS

A. Peres, "Delayed Choice for Entanglement Swapping," Department of Physics, Technion-Israel Institute of Technology, arXiv:quant-ph/ 9904042v1, Apr. 11, 1999.
C. Kurtsiefer et al., "Quantum Optics Devices," Lecture Notes, Les Houches Singapore, Centre for Quantum Technologies, 2009.
X. Ma et al. "Experimental Delayed-Choice Entanglement Swapping," Nature Physics, DOI:10.1038/NPHYS2294 , Apr. 22, 2012.
H. Traulsen, "Faster Communication Using Probabilistic Swapped-Bell-States Analysis," arXiv:1401.8000v3 [quant-ph], Aug. 11, 2014.

\* cited by examiner

ELECTRONIC QUANTUM INFORMATION PROBABILITY TRANSFER

RELATED APPLICATION

The present application is a continuation of and claims priority to U.S. patent application Ser. No. 15/203,511, filed on Jul. 6, 2016, entitled "ELECTRONIC QUANTUM INFORMATION PROBABILITY TRANSFER," which is a continuation of and claims priority to U.S. patent application Ser. No. 14/642,514, filed on Mar. 9, 2015, entitled "ELECTRONIC QUANTUM INFORMATION PROBABILITY TRANSFER," and issued on Aug. 9, 2016 as U.S. Pat. No. 9,413,470, the complete disclosures of which are incorporated by reference.

FIELD

The present disclosure relates to systems and methods for digital communication utilizing entangled qubits.

BACKGROUND

Information may be communicated by conventional means such as electronic signals, electromagnetic signals, photonic signals, audio signals, etc. For long distance and/or high-speed communication, typically some form of electronic communication is utilized, e.g., wired and/or wireless electrical, electromagnetic, and/or optical systems. Solutions typically require a physical communication channel (e.g., a wire, a fiber optic, a waveguide) and/or a clear path (a line of sight) between the sending device and the receiving device. Some types of communication systems may rely on an intense source that broadcasts a signal in a range of directions (e.g., a radio broadcast). All of these solutions are vulnerable to eavesdropping, jamming, and/or manipulation of the communication signal. Further, physical obstacles and/or distance between the sending device and the receiving device may hinder communication, for example, by blocking the signal and/or reducing the signal to noise ratio at the receiving device. Hence, there is a need for secure and/or reliable communication systems and methods.

SUMMARY

Methods of digital communication utilizing entangled qubits are disclosed. The communication methods exploit selective entanglement swapping to transfer an entangled state between a sending device and a receiving device. Each device includes pairs of qubits that are independently entangled with pairs of qubits in the other device. By selectively entangling the qubits within a pair in the sending device, the qubits of the corresponding pair in the receiving device also are selectively entangled. When the qubits are entangled, they are projected onto a particular entangled state type. Though no information may be transferred through selective entanglement of one qubit pair, the disclosed methods determine whether a set of pairs of qubits are entangled by determining whether the distribution of pairs is a correlated or uncorrelated distribution (a probabilistic approach) and transform the distribution type to a classical bit of data to transfer classical bits in a qubit-efficient approach.

Methods include digitally communicating between a sending device and a receiving device. Each of the sending device and the receiving device includes an entanglement queue of entanglement sets of entanglement pairs of qubits. The entanglement sets include marker entanglement sets and message entanglement sets. Each qubit of the sending device is entangled with a corresponding qubit of the receiving device. The method may include sending a marker bit from the sending device to the receiving device and/or may include receiving the marker bit at the receiving device from the sending device.

Sending the marker bit may include one of (a) entangling each entanglement pair of one of the marker entanglement sets of the sending device into an identical marker-bit entangled state to produce a correlated distribution in one of the marker entanglement sets of the receiving device in which every entanglement pair of the one of the marker entanglement sets of the receiving device is entangled, or (b) entangling less than all of the entanglement pairs of the one of the marker entanglement sets of the sending device into the identical marker-bit entangled state to produce an uncorrelated distribution in the one of the marker entanglement sets of the receiving device in which less than all entanglement pairs of the one of the marker entanglement sets of the receiving device are entangled in the identical marker-bit entangled state.

Receiving the marker bit may include one of (a) determining that each entanglement pair of one of the marker entanglement sets of the receiving device is in an identical marker-bit correlated state to identify a correlated distribution in the one of the marker entanglement sets of the receiving device, or (b) determining that less than all of the entanglement pairs of the one of the marker entanglement sets of the receiving device are in the identical marker-bit correlated state to identify an uncorrelated distribution in the one of the marker entanglement sets of the receiving device.

For each marker bit that corresponds to the correlated distribution in the marker entanglement set of the sending device, sending methods may further include sending a message of bits from the sending device to the receiving device by one of, independently for each bit of the message of bits, (a) entangling each entanglement pair of one of the message entanglement sets of the sending device into an identical message-bit entangled state to produce the correlated distribution in one of the message entanglement sets of the receiving device in which every entanglement pair of the one of the message entanglement sets of the receiving device is entangled, or (b) entangling less than all of the entanglement pairs of the one of the message entanglement sets of the sending device into the identical message-bit entangled state to produce the uncorrelated distribution in the one of the message entanglement sets of the receiving device in which less than all entanglement pairs of the one of the message entanglement sets of the receiving device are entangled in the identical message-bit entangled state.

For each marker bit that corresponds to the correlated distribution in the marker entanglement set of the receiving device, receiving methods may further include receiving a message of bits at the receiving device from the sending device by one of, independently for each bit of the message of bits, (a) determining that each entanglement pair of one of the message entanglement sets of the receiving device is in an identical message-bit correlated state to identify the correlated distribution in the one of the message entanglement sets of the receiving device, or (b) determining that less than all of the entanglement pairs of the one of the message entanglement sets of the receiving device are in the identical message-bit correlated state to identify the uncorrelated distribution in the one of the message entanglement sets of the receiving device.

DESCRIPTION

Figure 1:
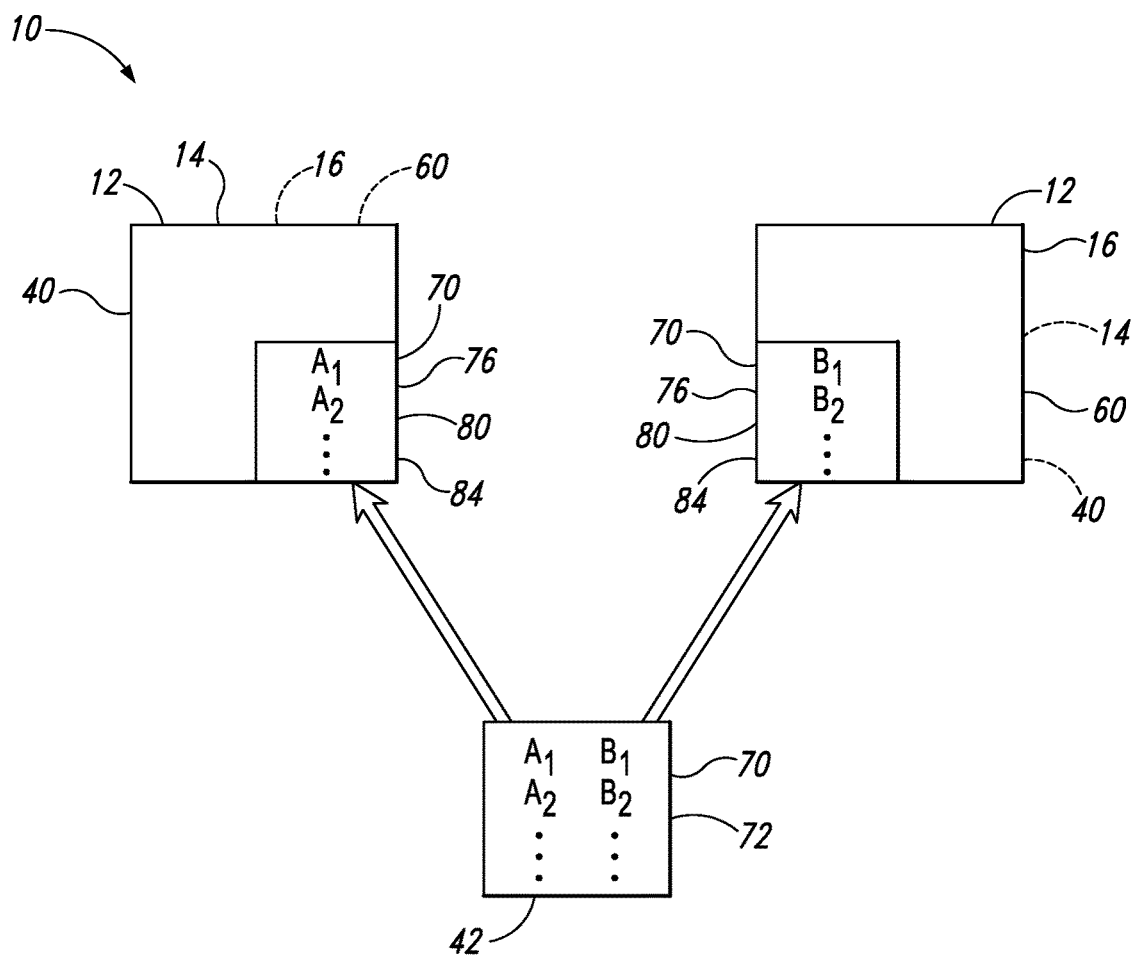
FIG. 1 is a schematic representation of a communication system for digital communication utilizing entangled qubits.

FIGS. 1-5 illustrate systems and methods for digital (electronic) communication utilizing entangled qubits. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of communication systems 10 for digital communication that rely on entangled qubits 70. Communication systems 10 are configured to transfer one or more classical bits of data between two or more communication devices 12. Each of the communication devices 12 may be a sending device 14 and/or a receiving device 16 (e.g., may be configured to send classical bits or receive classical bits). Each of the communication devices 12 include qubits 70 that are entangled with qubits 70 of one of the other communication device(s) 12. The entanglement of the qubits 70 is utilized to transmit a digital message of classical bits between the communication devices 12. The message may be transmitted without any corresponding classical communication. Additionally or alternatively, the communication devices 12 may not be connected by any sort of classical communication channel (cable, radio link, free-space laser link, conveyance, transporter, etc.) and/or may not include any classical communication transmitter configured to communicate with other communication devices 12.

Communication systems 10 are configured to send and to receive classical bits of data by selectively entangling qubits 70 in a sending device 14 and determining whether the corresponding qubits 70 in a receiving device 16 are likely in an entangled state or an unentangled state (also called a separable state). Sending devices 14 are configured to selectively entangle their qubits 70 to transmit classical bits of data with values (e.g., 1 or 0) that correspond to the entangled state of the qubits 70 (e.g., a value of 1) or the unentangled state of the qubits 70 (e.g., a value of 0). Receiving devices 16 are configured to determine whether their qubits 70 are likely in an entangled state or an unentangled state to receive classical bits of data with values (e.g., 1 or 0) corresponding to the entangled state determination (e.g., a value of 1) or the unentangled state determination (e.g., a value of 0).

As used herein, classical refers to classical physics and systems that may be described by classical physics without resort to a quantum physical description. A classical bit is a basic unit of information that may be one of two binary values, e.g., 0 or 1, + or −, true or false. A classical bit may encompass more than two values, for example 3 (i.e., a trit), 4, 5, or more values.

Qubits 70, also called quantum bits, are basic units of quantum information. Qubits 70 are two-state quantum systems that may be characterized as a superposition of the two states. The quantum system may be in a non-trivial superposition state in which both of the two states are simultaneously occupied with a relative probability (also called a probability amplitude) or in a trivial 'superposition' in which only one of the two states is occupied (analogous to a classical bit).

A superposition of states is a quantum property in which a quantum system simultaneously occupies all of the quantum states (e.g., the two states) with a characteristic occupation coefficient (the probability amplitude) for each state. While the superposition of states is undisturbed, the quantum system may be considered to be in all states at once. For example, a particle in a superposition of location states may be characterized as in two places at once, or in an undetermined location. However, when the quantum system is observed in a manner to establish which quantum state is occupied, the superposition of states collapses to one of the states of the quantum system (i.e., the probability amplitudes are altered by the observation). For example, the particle in a superposition of two locations would be actually observed to be in just one of the two locations. The probability of finding any one particle of an ensemble of particles in identical superposition states is dictated by the superposition state (i.e., the occupation coefficients/probability amplitudes). However, the actual state (e.g., location) of any individual particle would not be known (would be undetermined) until observed (measured). An observation (measurement) may be said to project the quantum system into the observed (measured) state.

Mathematically, a superposition of states in a two-state system may be expressed as:

$$|\Psi\rangle = \alpha|0\rangle + \beta|1\rangle$$

where the two states are $|0\rangle$ and $|1\rangle$, the superposition state is $|\Psi\rangle$, and the probabilities of measuring the quantum system in state $|0\rangle$ and $|1\rangle$ are $|\alpha^2|$ and $|\beta^2|$, respectively. The probability amplitudes $\alpha$ and $\beta$ (which may be imaginary numbers) are normalized such that $|\alpha^2|+|\beta^2|=1$. The two states, $|0\rangle$ and $|1\rangle$, also may be referred to as basis states and may be eigenstates of observables of the quantum system. Hence, a superposition may be described as a linear combination of basis states and/or a linear combination of eigenstates of observables of the quantum system.

Quantum systems may include a single quantum object or an ensemble of quantum objects. Examples of quantum objects include photons, electrons, ions, atoms, molecules, quasiparticles, excitons, plasmons, and quantum dots. Quantum objects and/or quantum systems also may be referred to as particles, even if the quantum object and/or quantum system is a photon, a quasiparticle, a composite object, etc. Quantum objects and/or quantum systems may be bosons, fermions, and/or combinations of bosons and fermions.

The two states of qubits 70 are two quantum states of the quantum system that are distinguishable. For example, the states may be a ground state and an excited state, Fock states (also called number states, e.g., the presence and the absence of a particle), spin states (e.g., spin up and spin down), polarization states (e.g., horizontal and vertical polarization, right circular polarization and left circular polarization), linear momentum states, angular momentum states, orbital angular momentum states, position states, energy-time states (e.g., early and late states as used in time-bin encoding), and coherent states (e.g., an amplitude-squeezed state and a phase-squeezed state of light). Hence, qubits 70 may be based upon, for example, polarization of a photon, orbital angular momentum of a photon, presence of a photon, spin of an electron, and/or presence of an electron.

Entanglement is a possible quantum property of a system of two or more quantum systems, each in a superposition of basis states, e.g., a system of two or more qubits 70. When two quantum systems are entangled they are said to be in an entangled state. Though each quantum system remains in a superposition of basis states while entangled (and, hence, each quantum system is in an undetermined state while entangled), measurement of one of the quantum systems (determining which is the basis state of the quantum system) also may uniquely determine the outcome of a measurement on the other quantum system(s). One constituent of an entangled state cannot be fully described without considering the other(s). Like individual quantum systems, the state of an entangled system is expressible as a superposition of basis states, which may be eigenstates of some observable(s). Entanglement is severed (broken) when the entangled quantum systems decohere through interaction with the environment, for example, when a measurement is made.

In some entangled states, the individual quantum systems will always be determined to be in the same basis state (positively correlated). In some entangled states, the individual quantum systems will always be determined to be in different basis states (anti-correlated, also referred to as negatively correlated). For example, two electrons in an anti-correlated entangled spin state (both electrons equally likely to be spin up or spin down) are entangled such that the electrons would always be measured in opposite spin states (one spin up and one spin down), although the spin state of either individual electron would remain (individually) random (i.e., equally likely to be spin up or spin down).

Further, the basis states of the quantum systems generally are not unique. As examples, spin of an electron and polarization of a photon may be measured relative to an arbitrary direction (perpendicular to the path of travel). Spin up and spin down states relative to one axis (e.g., an x-axis) may be basis states (a basis set). Equally valid basis states (another basis set) may be spin up and spin down states relative to another axis (e.g., a z-axis oriented perpendicular to the x-axis). The correlation between the measurements of the entangled quantum systems holds for all equivalent basis directions. If one entangled quantum system is measured in one basis direction (i.e., in one basis set), the other entangled quantum system(s) will be correlated in the same basis direction (basis set). However, if the entangled quantum systems are measured in different basis directions, the exact correlation is lost. Whatever the basis direction, the entangled quantum systems will be exactly correlated in just that direction, as though the basis direction of the measurement of one quantum system is communicated to the other quantum system(s).

Entanglement links the entangled quantum systems such that the measured states of the entangled quantum systems are correlated, even when the quantum systems are physically separated by distances (and/or times) that would otherwise have no possible classical communication channel. Thus, the link between the entangled quantum systems may be said to be in the 'elsewhere,' the region of spacetime outside of the light cones (the region of possible causal connections) of either quantum system. And, entanglement may be described as a non-local property of the set of entangled quantum systems, meaning that the separated entangled quantum systems can influence each other.

Entanglement imposes a correlation on the measurements of entangled quantum systems even when the entangled quantum systems are measured 'simultaneously,' i.e., faster than light could travel between the entangled quantum systems. Hence, entangled quantum systems may appear to communicate a measurement (e.g., the result and basis set) of one of the quantum systems to another of the quantum systems at super-luminal speeds (i.e., essentially simultaneously despite being separated). At least in part because spatially-separated simultaneity is a relative phenomenon (different observers may see separated events occurring simultaneously or at different times), entangled quantum systems may appear to communicate from the future to the past. An alternative point of view of the apparent transmission of signals from the future to the past can be found in the concept of 'counterfactual' entanglement, see, e.g., Oliver Cohen, Phys. Rev. A, 60:1 Jul. 1999. As used herein, backward time propagation of signals (transmission of signals from the future to the past) is used to describe the same phenomenon. An alternative model may be substituted without loss of generality.

The entanglement link between entangled quantum systems may be severed (broken) by decoherence of the entangled state. Though the entangled state may be decohered by interactions with the local environment of one or more of the entangled quantum systems, the entanglement link is not generally influenced by the environment between the entangled quantum systems like a classical communication channel would be. Specifically, a classical communication channel transmits a signal between two locations and the channel is subject to interference such as blocking or eavesdropping by manipulation of the environment (e.g., by severing the channel or by adding a listening device). An entanglement link is not manifest in any physical object but the entangled quantum systems, and the entanglement link is not carried by any field between the entangled quantum systems. Thus, communication through an entanglement link would not be blocked and/or intercepted by something in the space between the entangled particles. Because the communication through the entanglement link may not be intercepted, secure communications are possible without resort to encryption. Because the communication through the entanglement link may not be blocked, and because the distance between the entangled quantum systems does not degrade the entanglement link, entanglement links appear useful for satellite communication, communication without a line of sight, submerged submarine communication, underground communication (e.g., mining, spelunking), and transmission from aircraft black boxes.

While entangled quantum systems appear to be well suited to secure, covert, and/or super-luminal communication, the no-communication theorem states that measurement of one entangled quantum system of an entangled group of quantum systems communicates no information to the other quantum system(s). That is, making a measurement of a subsystem (one of the entangled quantum systems) of the total system (the entangled group of quantum systems) imparts no information to the rest of the total system (i.e., is not detectable by the rest of the total system).

Though entanglement may involve two or more quantum systems, general discussion throughout this disclosure may refer to entanglement of two quantum systems for clarity. Hence, reference to two entangled quantum systems (e.g., a pair of entangled qubits) is intended to include two or more entangled quantum systems, e.g., two, three, four, or more entangled quantum systems.

In an entangled state, the entangled quantum systems show non-classical correlations between individual measurements on the individual quantum systems, such as positive or negative correlations regardless of basis set. For an entangled system of two qubits 70, four maximally entangled states exist (i.e., states with maximal entanglement correlations). These states are known as Bell states.

The four Bell states for a two qubit entangled system are:

$$|\Phi^+\rangle = \frac{1}{\sqrt{2}}[|0_A 0_B\rangle + |1_A 1_B\rangle]$$

$$|\Phi^-\rangle = \frac{1}{\sqrt{2}}[|0_A 0_B\rangle + |1_A 1_B\rangle]$$

$$|\Psi^+\rangle = \frac{1}{\sqrt{2}}[|0_A 1_B\rangle + |1_A 0_B\rangle]$$

$$|\Psi^-\rangle = \frac{1}{\sqrt{2}}[|0_A 1_B\rangle + |1_A 0_B\rangle]$$

where the subscripts A and B refer to the two entangled qubits. Each qubit (A and B) may be in one of two states, $|0\rangle$ and $|1\rangle$, with equal probability. In the $|\Phi^+\rangle$ and $|\Phi^-\rangle$ states, the two qubits will always be measured in the same state with equal probabilities of the two possible outcomes, i.e., both $|0\rangle$ or both $|1\rangle$ (expressed as $|0_A 0_B\rangle$ and $|1_A 1_B\rangle$, respectively, in the Bell state equations). In the $|\Psi^+\rangle$ and $|\Psi^-\rangle$ states, the two qubits will always be measured in opposite states with equal probabilities of the two possible outcomes, one $|0\rangle$ and one $|1\rangle$, or the reverse (expressed as $|0_A 1_B\rangle$ and $|1_A 0_B\rangle$ in the Bell state equations). Thus, though each qubit independently appears to be randomly distributed between its basis states, $|0\rangle$ and $|1\rangle$, the combined measurement of the two qubits always shows a correlation. The states $|\Phi^+\rangle$ and $|\Phi^-\rangle$ have a positive correlation and the states $|\Psi^+\rangle$ and $|\Psi^-\rangle$ have a negative correlation. The states $|\Phi^+\rangle$, $|\Phi^-\rangle$, and $|\Psi^+\rangle$ are all invariant upon swapping of qubits A and B, and together may be referred to as triplet states. The state $|\Psi^-\rangle$ is not invariant to the swap of qubits A and B, and may be referred to as the singlet state.

Entanglement is the result of quantum systems interacting in a particular fashion to link the states of each of the quantum systems. Entanglement may be the result of joint production of the quantum systems, joint interaction of the quantum systems, and/or entanglement swapping (involving a joint measurement of related quantum systems).

Joint production of entangled quantum systems may be performed in any suitable manner. As an example, subatomic particles may decay into an entangled pair of daughter particles. The decay may obey conservation laws such as conservation of mass, energy, momentum, angular momentum, etc. Thus, the daughter particles may be produced such that total value of the conserved quantity is known but the individual values of the daughter particles is undetermined (i.e., the daughter particles may be formed in superposition states that are entangled with each other). Additionally, daughter particles may be formed at the same time (energy-time entanglement). For instance, a spin-zero particle may decay into a pair of spin-½ particles. If angular momentum is conserved, the total spin remains zero after the decay and the daughter particles must have opposite spins (an anti-correlated entangled state). As another example, entangled photons may be produced through a process known as spontaneous parametric down conversion (also known as SPDC, parametric fluorescence, and parametric scattering). In SPDC, interaction of one photon with a particular type of non-linear crystal (such as BBO (beta-barium borate) crystal and a KDP (potassium dihydrogen phosphate) crystal results in two photons that have combined energies and momenta equal to the energy and momentum of the original photon and that have correlated polarizations. Additionally, the SPDC photons are formed at the same time (energy-time entanglement). SPDC devices are known to those skilled in the art and may be configured to emit entangled photons that share the same polarization (type I devices) or that have perpendicular polarizations (type II devices). Type I devices produce a positive correlation and type II devices produce a negative correlation.

Entanglement through joint interaction of quantum systems may be performed in any suitable manner. As an example, indistinguishable photons impinging on a 50:50 beam splitter from opposite sides will emerge in a joint state emanating in one of two directions from the beam splitter (the Hong-Ou-Mandel effect). Other methods include confining photons in a waveguide, atomic cascades, Raman scattering (between a photon and an ion or atom), interactions in QED (quantum electrodynamic) cavities (which may entangle photons, ions, and/or atoms).

Entanglement swapping, another method of creating entanglement, relies on groups of previously entangled quantum systems. In entanglement swapping, one part of each of the groups of entangled quantum systems is entangled to entangle the other parts of the groups of entangled quantum systems. Each entangled group includes at least two entangled quantum systems, but, for clarity, entangled groups of two are discussed in this example. Similarly, entanglement swapping may be performed with more than two entangled groups, but this example focuses on entanglement swapping with a pair of entangled groups.

Initially, each of the entangled groups has no correlation with the other, i.e., is independent of the other. The quantum systems of one of the entangled groups may have never interacted with the quantum systems of the other entangled group. For the sake of this example, the quantum systems of the first entangled group are called A1 and B1, and the quantum systems of the second entangled group are called A2 and B2. The entangled groups may be split such that a first location may include one quantum system from each entangled group (i.e., A1 and A2) and a second location may include the other quantum systems (i.e., B1 and B2). The quantum systems at the first location (A1 and A2) may be entangled (as discussed herein with respect to entangling quantum systems) and observed in the new entangled state (together referred to as a joint entanglement measurement). The joint entanglement measurement projects the quantum systems of the first location (A1 and A2) into an entangled state and collapses the original entanglement within the entangled groups (i.e., A1 and B1 are no longer entangled, and A2 and B2 are no longer entangled). The joint entanglement measurement also projects the quantum systems of the second location (B1 and B2) into an entangled state (typically, the same entangled state as that of A1 and A2), even though the quantum systems of the second location (B1 and B2) may never have directly interacted.

The joint entanglement measurement may be a Bell-state measurement, i.e., a measurement configured to project the quantum systems into at least one of the Bell states. Some Bell-state measurements are configured to project the quantum systems into any of the Bell states (i.e., capable of measuring all Bell states), while other Bell-state measurements are configured to project the quantum systems into any of a subset of the Bell states (i.e., capable of measuring only some of the Bell states). A Bell-state measurement, like a joint entanglement measurement, is an entangling operation.

Figure 2:
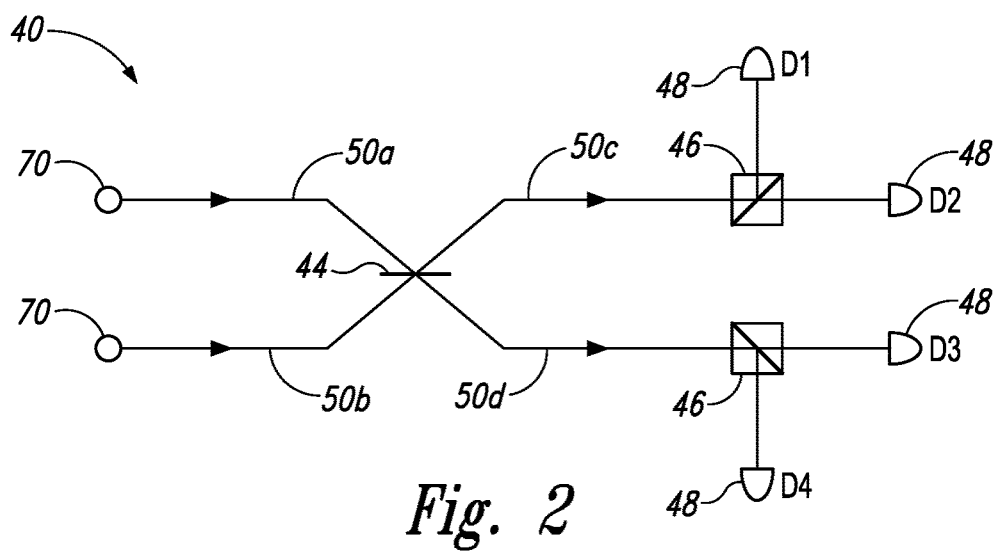
FIG. 2 is a schematic representation of an example of an entanglement device.

FIG. 2 shows an example of a Bell-state measurement apparatus (which may be, or may be a component of, an entanglement device 40 as discussed further herein). In this example, the qubits 70 are photons that may be entangled in polarization. The two qubits 70 initially travel along separate optical paths 50a and 50b. The two qubits 70 are directed (e.g., with conventional optics) to combine at a beam splitter 44 in the Hong-Ou-Mandel configuration. The beam splitter 44 is configured to transmit and reflect a photon with equal probabilities, regardless of the initial polarization of the photon. The two qubits 70 may emerge from the beam splitter in some combination of the optical paths 50c and 50d.

At the terminuses of the optical paths 50c and 50d are a group of detectors 48 configured to measure the presence and polarization of the photon(s) in the optical paths 50c and 50d. The detectors 48 are photodetectors, generally configured for coincidence counting of incoming photons. Examples of suitable detectors include avalanche photodiodes and photomultiplier tubes. Prior to the detectors 48, each optical path 50c and 50d includes a polarizing beam splitter 46. The polarizing beam splitters 46 are each configured to transmit photons of one polarization and reflect photons of the orthogonal polarization. Generally, the polarizing beam splitters 46 may be aligned such that horizontal polarization is transmitted and vertical polarization is reflected. If a photon in an equal superposition of horizontal and vertical polarization states (more generally, in a superposition of polarization basis states that are aligned with the polarizing beam splitter 46), the photon will be transmitted or reflected with equal probabilities. The detectors 48 are each configured to measure one of the possible polarization directions along one of the optical paths 50c and 50d. Further, the detectors 48 may be configured for coincidence detection such that the Bell-state measurement is performed only if two of the detectors 48 detect a photon at essentially the same time. Additionally or alternatively, the detectors 48 may be configured to detect the number of photons (e.g., 1 or 2) that arrive.

The example Bell-state measurement apparatus of FIG. 2 may only uniquely determine two of the four Bell states unless the detectors 48 are configured to detect the number of photons also. With detectors 48 configured to measure the presence or absence of photons (e.g., configured in photon counting mode), this Bell-state measurement apparatus may uniquely detect the $|\Psi^+\rangle$ and $|\Psi^-\rangle$ Bell states. The $|\Phi^+\rangle$ and $|\Phi^-\rangle$ Bell states result in two photons simultaneously arriving in one of the detectors 48.

Ultimately, not all Bell states for entanglement in a single qubit variable (e.g., polarization states) may be simultaneously detectable with linear optical techniques. Hence, with linear optical techniques, at least one Bell state is indistinguishable from another. The corresponding Bell-state measurement may be said to be incomplete (i.e., it is an incomplete Bell-state measurement). If a Bell-state measurement is ambiguous or fails (e.g., due to an incomplete Bell-state measurement or due to one or more of the photons not being detected), the qubits 70 subject to the Bell-state measurement may not be entangled and/or may be entangled in a superposition of Bell states. Any corresponding entanglement swapping also may fail, be incomplete, and/or be ambiguous.

However, when qubits 70 are entangled in multiple qubit variables (e.g., for photons, at least two of polarization states, energy-time states, orbital angular momentum states, and Fock states), the 'extra' qubit variables may be exploited to measure all four Bell states of one of the qubit variables with linear optical techniques. Qubits 70 entangled in multiple qubit variables may be called hyper-entangled qubits 70. A Bell-state measurement configured to measure any of the four Bell-states of one qubit variable may be said to be complete (i.e., it is a complete Bell-state measurement).

Figure 3:
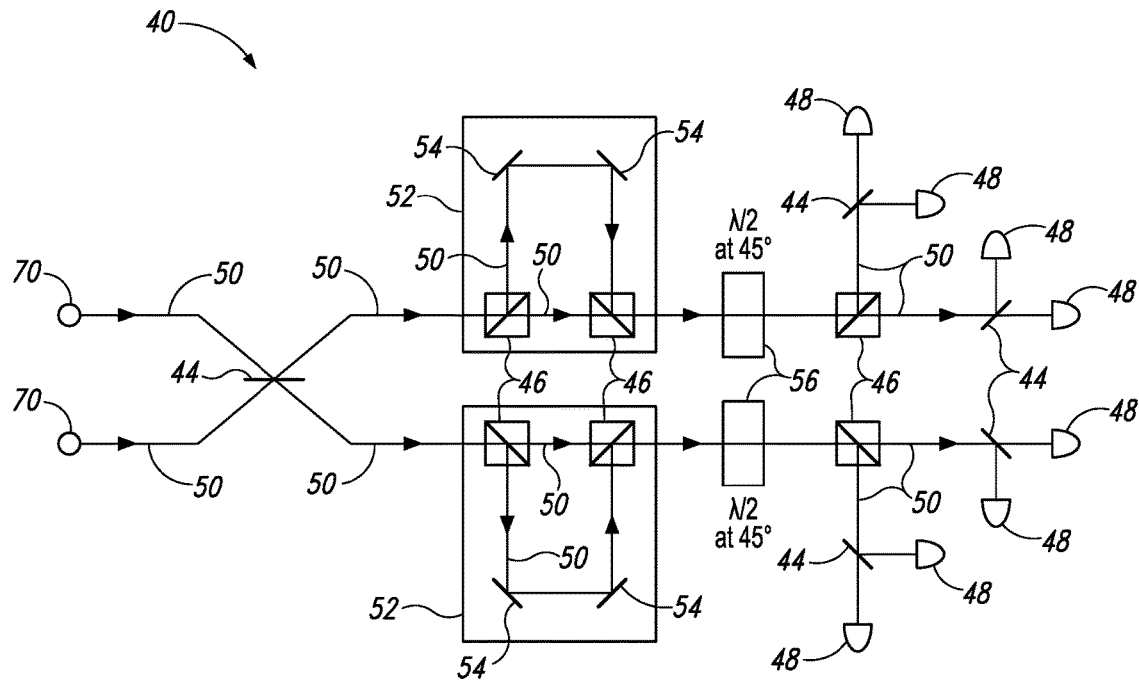
FIG. 3 is a schematic representation of another example of an entanglement device.

FIG. 3 shows an example of a complete Bell-state measurement apparatus configured to determine the polarization Bell-state of photons hyper-entangled in polarization states and energy-time states. Many processes create qubits 70 entangled in energy-time states, for example, processes that generate indistinguishable entangled qubits 70 at the same time entangle those qubits 70 in time as well. Particles generated at other times would not be entangled with the entangled qubits 70. For photons, detection time may be highly correlated to time of production (e.g., the optical path from source to detector may be known). Photons generated by SPDC are energy-time entangled as well as polarization entangled.

The optical paths 50 of the Bell-state measurement apparatus of FIG. 3 begin like those in FIG. 2. The two qubits 70 are directed to and through a beam splitter 44 in a Hong-Ou-Mandel configuration. After the beam splitter 44, the qubits 70 of the $|\Psi^+\rangle$ state will split between the upper and lower optical paths 50 and may be distinguished by detecting a photon from each of the upper and lower optical paths 50 (e.g., determining that one of the upper detectors 48 and one of the lower detectors 48 senses a photon). The qubits 70 of the other three Bell states, $|\Psi^-\rangle$, $|\Phi^+\rangle$, and $|\Phi^-\rangle$ travel together in one of the upper or lower optical paths 50.

The qubits 70 of the $|\Psi^-\rangle$ state have orthogonal polarizations. One of the orthogonal polarizations is subject to a delay in a polarization delay device 52. In the polarization delay device 52, a polarizing beam splitter 46 separates the horizontal and vertical polarizations into a short path (e.g., horizontal polarization) and a long path (e.g., vertical polarization). The short and long paths are then recombined at a second polarizing beam splitter 46. Which polarizations traverse the short and long paths may be exchanged (e.g., horizontal polarization could be directed along the long path). The long path is illustrated as a pair of mirrors 54 in a trombone arrangement. Other types of optical delay lines may be used (e.g., a fiber optic). After traversing the polarization delay device 52, the photons of the $|\Psi^-\rangle$ state are separated in time by a characteristic delay time and may be distinguished by detecting a pair of photons with this characteristic delay.

The qubits 70 of the $|\Phi^+\rangle$ and $|\Phi^-\rangle$ states are in superpositions of identical polarizations, with only phase differentiating the states (i.e., the sign in the superposition sum). Because the polarizations are identical, the polarization delay device 52 does not separate the qubits 70 of the $|\Phi^+\rangle$ and $|\Phi^-\rangle$ states. The output of the polarization delay devices 52 leads to a polarization rotator 56 (also called a compensator) configured to rotate the polarization of incoming light 45°. The polarization rotator 56 may be a half waveplate oriented to rotate the incoming polarization by 45° (e.g., oriented at 22.5° to the vertical). The polarization rotator 56 effects a rotation of the basis set of the downstream detectors 48. The detectors 48 are configured to detect photons polarized in the +45°, −45° basis rather than the horizontal, vertical basis. This rotation of basis may change the $|\Phi^+\rangle$ and $|\Phi^-\rangle$ states to:

$$|\Phi^+\rangle = \frac{1}{\sqrt{2}}[|+45°, +45°\rangle + |-45°, -45°\rangle]$$

$$|\Phi^-\rangle = \frac{1}{\sqrt{2}}[|+45°, -45°\rangle + |-45°, +45°\rangle]$$

Therefore, the $|\Phi^+\rangle$ state may be distinguished by detecting a pair of simultaneous photons with the same polarization (in the +45°, −45° basis) along the same optical path 50 (upper or lower), and the $|\Phi^-\rangle$ state may be distinguished by detecting a pair of simultaneous photons with orthogonal polarizations (in the +45°, −45° basis) along the same optical path 50 (upper or lower).

Returning to FIG. 1, communication systems 10 exploit the phenomenon of entanglement swapping to transfer entangled states from the qubits 70 of the sending device 14 to the qubits 70 of the receiving device 16.

Figure 5:
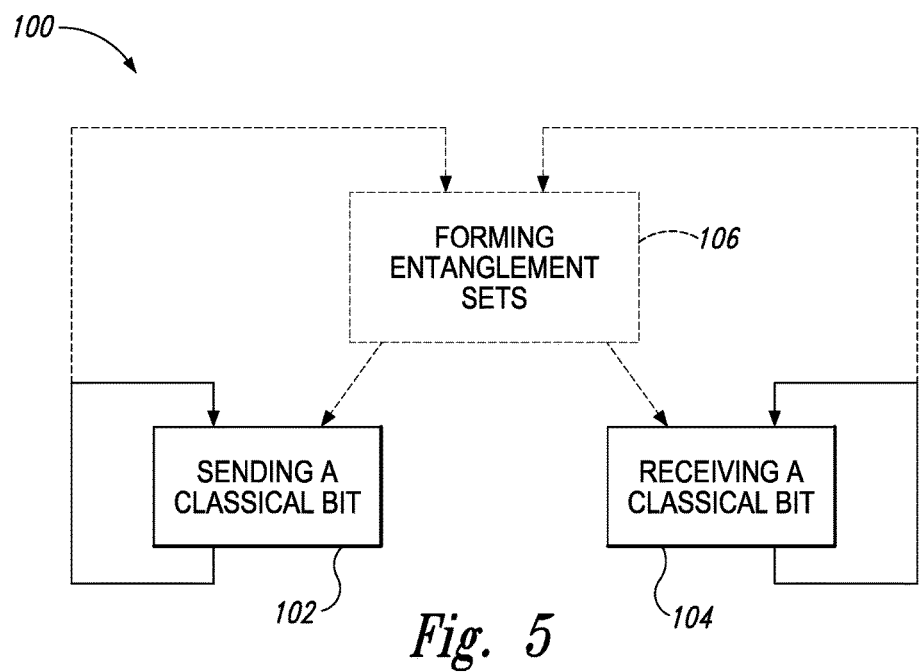
FIG. 5 is a schematic representation of methods for digital communication utilizing entangled qubits.
Figure 4:
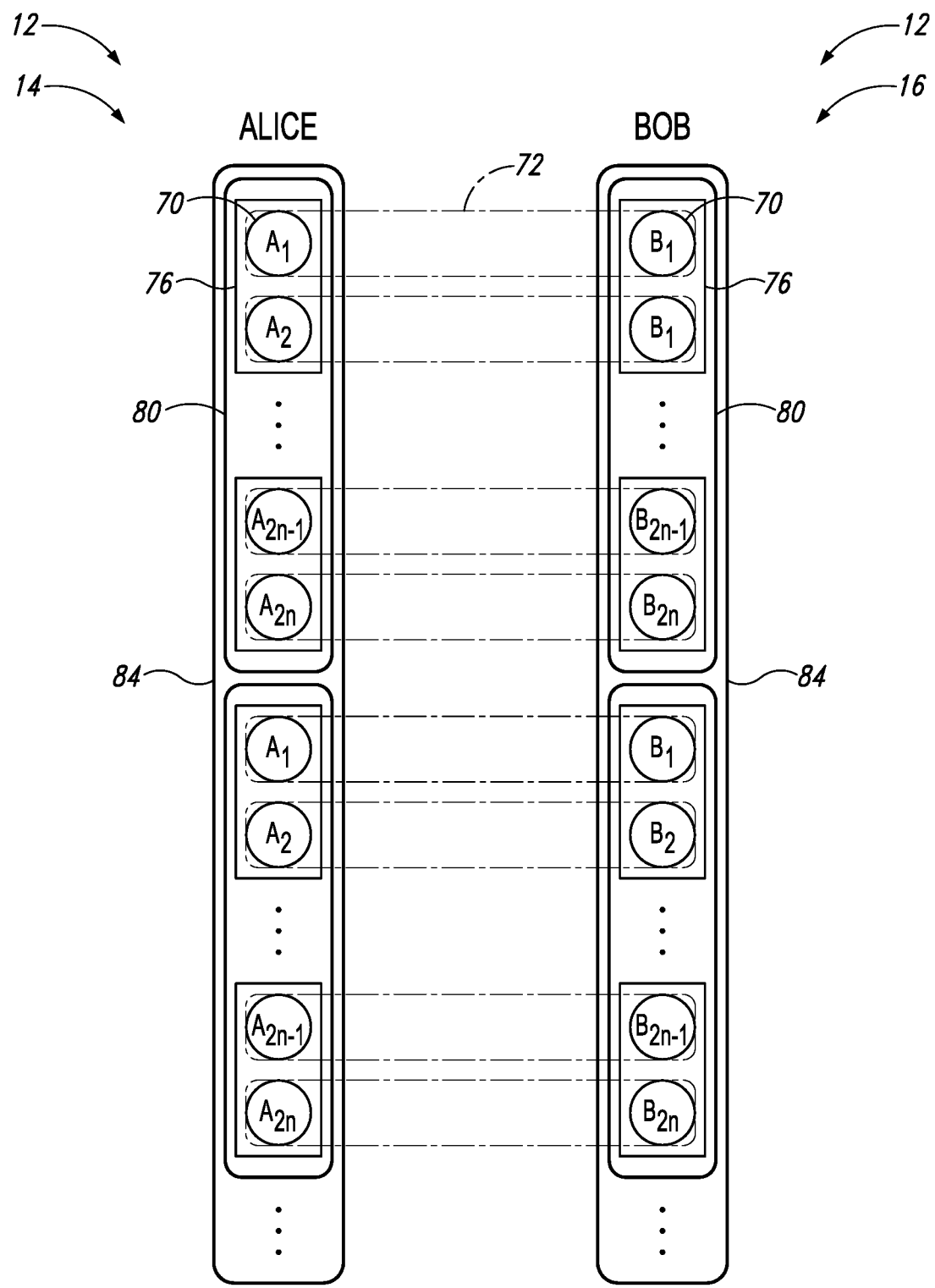
FIG. 4 is a schematic representation of the organization of entangled qubits within two communication devices.

To leverage the entanglement swapping to transmit classical bits, the qubits 70 are entangled and organized as illustrated in FIG. 5. First, qubits 70 are entangled in entangled groups 72. The entangled groups 72 include two or more qubits 70 in an entangled state. All qubits 70 of an entangled group 72 may be the same type (e.g., all photons) or different types (e.g., a photon and an atom). Entangled groups 72 may be hyper-entangled.

Each of the entangled groups 72 is partitioned among the communication devices 12 (e.g., half to the sending device 14 and half to the receiving device 16), with each communication device including at least one qubit 70 from each of the entangled groups 72. The communication devices 12 may be separated in different locations, designated Alice and Bob, in keeping with the conventions of quantum information theory. Though FIG. 5 associates Alice with the sending device 14 and Bob with the receiving device 16, the roles and devices of Alice and Bob may be symmetric and/or interchangeable. Hence, each of Alice and Bob may have a sending device 14, a receiving device 16, and/or a communication device 12 configured for both sending and receiving, so long as at least one of Alice and Bob has a sending device 14 and the other has a receiving device 16. Also, though just Alice and Bob may be referenced, the number of sites and/or devices may be greater than two. In embodiments with two or more sites, each site and/or device may be configured to communicate directly with one or more of the other sites.

Entangled states may be delicate and subject to rapid decoherence (loss of entanglement). As examples of relatively robust entangled states, certain quantum systems have been entangled for minutes and entangled photons have propagated over 100 km (kilometers). Communication devices 12 may be configured to protect the entangled states of the entangled groups 72 and/or to utilize the entangled groups 72 before the corresponding entangled states are likely to decohere.

Entangled qubits 70 based on photons generally decohere rapidly during propagation in the atmosphere, resulting in loss of entanglement with the other entangled qubits 70 (e.g., a photon or an atomic system). Coherent photon states, e.g., as usually generated in a laser, are much more robust to decoherence. Hence, qubits 70 may include coherent photon states. Propagation in space, a vacuum, or a waveguide typically does not lead to as rapid decoherence as propagation in the atmosphere. Therefore, communication devices 12 may be configured to propagate photonic qubits 70 in space, a vacuum, and/or a waveguide to maintain coherence of the entangled state of photonic qubits 70.

For entangled qubits 70 based upon ions and/or atoms, communications devices 12 may include ion traps (e.g., a Paul trap) and/or atomic traps (e.g., a magnetic trap) configured to maintain coherence of the entangled state of ionic and/or atomic qubits 70.

Within each communication device 12, the separated, entangled qubits 70 are arranged in pairs, called entanglement pairs 76. Each entanglement pair 76 of one communication device 12 has a corresponding entanglement pair 76 in the other communication device(s) 12. Thus, entanglement of the entanglement pair 76 of one communication device 12 (e.g., the sending device 14) results in entanglement of the corresponding entanglement pair 76 of the other communication device(s) (e.g., the receiving device 16) via the mechanism of entanglement swapping.

As an example following the notations in FIG. 5, the communication system 10 includes at least two entangled groups 72 of qubits 70. The qubits 70 of the first entangled group 72 are designated $A_1$ and $B_1$. The qubits 70 of the second entangled group 72 are designated $A_2$ and $B_2$. The qubits 70 with the same index, e.g., $A_i$ and $B_i$, form independent entangled groups 72. Each entangled group 72 is split between the sending device 14 and the receiving device 16, with one of the qubits 70 of each entangled group 72 at each communication device 12. Specifically, the sending device 14 includes $A_1$ and $A_2$, and the receiving device 16 includes $B_1$ and $B_2$. The separated, entangled qubits 70 are arranged into corresponding entanglement pairs 76 in each communication device 12. Specifically, the entanglement pair 76 of the sending device 14 is $A_1$ and $A_2$, and the corresponding entanglement pair 76 of the receiving device 16 is $B_1$ and $B_2$.

Each of the entanglement pairs 76 are distinguishable (e.g., in an ordered list, labelled, offset in time, and/or located in different positions). Each of the qubits 70 also may be distinguishable.

Within each communication device 12, the entanglement pairs 76 are arranged in one or more entanglement sets 80. Each entanglement set 80 of one communication device 12 has a corresponding entanglement set 80 in the other communication device(s) 12. Each entanglement pair 76 of each entanglement set 80 of each communication device 12 has a corresponding entanglement pair 76 in the corresponding entanglement set 80 of the other communication device(s) 12. Thus, independent entanglement of each of the entanglement pairs 76 of one entanglement set 80 of one communication device 12 (e.g., the sending device 14) results in the corresponding entanglement set(s) 80 of the other communication device(s) 12 (e.g., the receiving device 16) containing corresponding entangled entanglement pairs 76.

Entanglement sets 80 correspond to classical bits as discussed further herein. All corresponding entanglement sets 80 in communication devices 12 include the same number of entanglement pairs 76. However, each entanglement set 80 within a communication device 12 may include an independent number of entanglement pairs 76. Thus, some classical bits may be derived from a larger number of entanglement pairs 76 than other classical bits.

Following the example of FIG. 5, the sending device 14 includes at least two entanglement pairs 76 arranged in an entanglement set 80. The receiving device 16 includes the same number of entanglement pairs 76 arranged in the same manner in a corresponding entanglement set 80. The first entanglement pair 76 of the sending device 14 includes the qubits 70 designated $A_1$ and $A_2$. Other entanglement pairs 76 of the sending device 14 may be designated as $A_{2i-1}$ and $A_{2i}$, where i is the index of the entanglement pair 76. The last entanglement pair 76 of the indicated entanglement set 80 of the sending device 14 includes the qubits 70 designated as $A_{2n-1}$ and $A_{2n}$, where n is the total number of entanglement pairs 76 in the entanglement set 80.

The receiving device 16 includes a first entanglement pair 76 of qubits 70, $B_1$ and $B_2$. Other entanglement pairs 76 of the receiving device 16 may be designated as $B_{2i-1}$ and $B_{2i}$, in analog to the corresponding qubits 70 of the sending device 14. The last entanglement pair 76 of the indicated entanglement set 80 of the receiving device 16 includes the qubits 70 designated as $B_{2n-1}$ and $B_{2n}$.

Within each communication device 12, the entanglement sets 80 are ordered in an entanglement queue 84. The entanglement queues 84 of the communication devices 12 all have the same order. Communication devices 12 are configured to utilize corresponding entanglement sets 80 in a predefined order (i.e., the order of the entanglement queues 84).

Communication devices 12 are configured to operate on at least one entanglement pair 76 at a time. For example, communication devices 12 may operate on, within one time period, one entanglement pair 76, two entanglement pairs 76, one entanglement set 80, etc. Entanglement pairs 76 may be generated as needed and/or communication devices 12 may be configured to store entanglement pairs 76 until the entanglement pair 76 is needed to transmit a classical bit. Hence, entanglement queues 84 may be replenished as entanglement pairs 76 and/or entanglement sets 80 are utilized (due to measurement of one of the underlying entangled groups 72) and/or expire (due to actual or projected decoherence of the underlying entangled groups 72).

Returning to FIG. 1, communication systems 10 may include an entangled qubit source 42 that is configured to produce entangled groups 72 and that may be configured to produce entangled qubits 70 as discussed herein (e.g., by joint production, by joint interaction, and/or by entanglement swapping). The entangled qubit source 42 is configured to produce independent entangled groups 72, meaning that qubits 70 of one entangled group 72 are not produced entangled with qubits 70 of another entangled group 72.

The entangled groups 72 of the entangled qubit source 42 are split into at least two pools, one for each communication device 12 (e.g., one for the sending device 14 and one for the receiving device 16). In each pool is one qubit 70 from each of the entangled groups 72. A single pool may correspond to, and/or may be, a single entangled qubit 70 of an entangled group 72, one or more entanglement pairs 76, one or more entanglement sets 80, and/or an entanglement queue 84.

The entangled qubit source 42 may be configured to transmit the pools to the communication devices 12 (generally one pool for each communication device 12). Additionally or alternatively, the entangled qubit source 42 may be a component of one of the communication devices 12. That communication device 12 and/or the entangled qubit source 42 may be configured to transmit one of the pools of entangled qubits 70 to each of the other communication devices 12.

Sending devices 14 are configured to selectively entangle selected qubits 70 of the sending device 14. Sending devices 14 may be configured to selectively entangle or not entangle the selected qubits 70 of the sending device 14.

Sending devices 14 include an entanglement device 40 configured to selectively entangle the qubits 70 of an entanglement pair 76 of the sending device 14. The entanglement device 40 may be configured to perform a joint entanglement measurement (e.g., a Bell-state measurement and/or a complete Bell-state measurement) to entangle the qubits 70. The entanglement device 40 may be configured to selectively entangle one or more entanglement pairs 76 at one time and/or one or more entanglement sets 80 at one time. Where the entanglement device 40 is configured to selectively entangle more than one entanglement pair 76 at the same time, each entanglement pair 76 is entangled (or not) independently.

To not entangle selected entanglement pairs 76, sending devices 14 may be configured to selectively discard one or both of the qubits 70 of the entanglement pair 76 and/or to selectively perform a separable-state measurement on one or both of the qubits 70 of the entanglement pair 76. A separable-state measurement is a measurement to determine the individual states of the selected qubits 70, without entangling the qubits 70. Performing a separable-state measurement projects a separable state (an unentangled state) onto the measured qubits 70. As an example, for qubits 70 based on the polarization of photons, a separable-state measurement may be performed by measuring the polarization (e.g., determining a horizontal or vertical polarization) of each photon independently.

Receiving devices 16 are configured to selectively determine whether entanglement pairs 76 of entanglement sets 80 of the receiving device 16 are likely entangled (due to entanglement of all of the corresponding entanglement pairs 76 of the sending device 14). Receiving devices 16 include a measurement device 60 configured to measure the state of the entanglement pairs 76 of the selected entanglement set(s) 80. Measurement devices 60 may be configured to perform a separable-state measurement on each of the entanglement pairs 76 of the selected entanglement set(s) 80.

Receiving devices 16 may be configured to determine whether the entanglement pairs 76 of the selected entanglement set 80 are in a correlated distribution or in an uncorrelated distribution as discussed further herein. Further, receiving devices 16 may be configured to assign a classical bit value according to the type of distribution determined (e.g., a value of 1 for a correlated distribution and a value of 0 for an uncorrelated distribution).

FIG. 5 schematically represents methods 100 of digital communication utilizing entangled qubits. The foundation for the systems and methods for digital communication utilizing entangled qubits is at least two related entanglement pairs 76 located in at least two sites. As with FIG. 4, the two sites and the corresponding actors at those sites may be labelled Alice and Bob. Though generally Alice is described as the sender of information and Bob is described as the receiver, either or both of Alice and Bob may send and/or receive information, so long as at least one of Alice and Bob sends information and the other receives information.

Methods 100 may include forming 106 an entanglement set 80 of at least two entanglement pairs 76 and a corresponding entanglement set 80 of at least two corresponding entanglement pairs 76. Each entanglement pair 76 and corresponding entanglement pair 76 is formed together by first forming a first entangled group 72 (by entangling two or more qubits 70) and a second entangled group 72 (by entangling two or more qubits 70) and then separating the qubits of first entangled group and the qubits of the second entangled group to locate one qubit of each of the first entangled group and the second entangled group in a first location (Alice) and to locate the other qubits of each of the first entangled group and the second entangled group in a second location (Bob). The qubits in the first location (Alice) are the entanglement pair and the qubits in the second location (Bob) are the corresponding entangled pair.

Entangled groups 72 may be prepared in a known entanglement state. For clarity, an example entangled group 72 may consist of identical qubits Ai, Bi, . . . , where i denotes the index of the entangled group. After entanglement, the qubits 70 of an entangled group 72 are separated and located at different sites, e.g., the Ai qubits are sent to Alice and the Bi qubits are sent to Bob. The qubits 70 of entangled groups 72 are collected into entanglement pairs 76, i.e., pairs of entangled qubits at each location, each pair including one part of each of the two constituent entangled groups 72. For example, an entanglement pair with Alice may include qubits A1 and A2, and the corresponding entanglement pair with Bob may include qubits B1 and B2.

Methods 100 may include sending 102 a classical bit from the first location (Alice) to the second location (Bob) by selectively entangling all entanglement pairs 76 of an entanglement set 80 corresponding to the classical bit. Selectively entangling includes one of (a) entangling each entanglement pair 76 of the entanglement set 80 (Alice's entanglement set) to produce a correlated distribution in the corresponding entanglement set 80 (Bob's entanglement set) in which every corresponding entanglement pair 76 of the corresponding entanglement set 80 is entangled, or (b) entangling less than all (optionally none) of the entanglement pairs 76 of the entanglement set 80 (Alice's entanglement set) to produce an uncorrelated distribution in the corresponding entanglement set 80 (Bob's entanglement set) in which less than all (optionally none) of the corresponding entanglement pairs 76 of the corresponding entanglement set 80 are entangled. The value of the transmitted classical bit (e.g., 1 or 0) corresponds to the correlated distribution (e.g., a value of 1) and the uncorrelated distribution (e.g., a value of 0).

Methods 100 may include receiving 104 a classical bit from the first location (Alice) at the second location (Bob) by determining the type of distribution in the corresponding entanglement set 80 (either a correlated distribution or an uncorrelated distribution of corresponding entanglement pairs 76). Determining the distribution type includes one of (a) determining that each corresponding entanglement pair 76 of the corresponding entanglement set 80 (Bob's entanglement set) is in a possible entangled state to identify a correlated distribution in the corresponding entanglement set 80 (Bob's entanglement set), or (b) determining that at least one of the corresponding entanglement pairs 76 of the corresponding entanglement set 80 (Bob's entanglement set) is in a separable state to identify an uncorrelated distribution in the corresponding entanglement set 80 (Bob's entanglement set). The value of the transmitted classical bit (e.g., 1 or 0) corresponds to the correlated distribution (e.g., a value of 1) and the uncorrelated distribution (e.g., a value of 0).

Initially (before utilization of the entanglement pairs 76), the entangled groups 72 are entangled but the different qubits 70 of the entanglement pairs 76 are in separable states (unentangled with each other). That is, entanglement exists only within each entangled group 72 of an entanglement pair 76. To send a message, Alice may selectively entangle her qubits A1 and A2 of an entanglement pair (via selective utilization of an entanglement operation such as a Bell-state measurement). Through the process of entanglement swapping, once the qubits A1 and A2 are entangled, the corresponding qubits B1 and B2 of Bob's corresponding entanglement pair become likewise entangled, and the original entanglements within the entangled groups (between A1 and B1, and between A2 and B2) are severed. After Alice has acted on her qubits (A1 and A2), Bob determines whether his qubits (B1 and B2) may be entangled by measuring correlations between his qubits. If Alice entangled her qubits (A1 and A2), Bob's qubits (B1 and B2) would have a statistical correlation according to the entanglement state imposed by Alice (and optionally the original entanglement state(s) of the entangled groups). If Alice did not entangle her qubits (A1 and A2), Bob's qubits (B1 and B2) would remain in a separable state and measurements of Bob's qubits would be uncorrelated (random).

Without more, Bob cannot learn whether Alice entangled her qubits (A1 and A2) by measuring his qubits (B1 and B2), consistent with the no-communication theorem. First, Bob would essentially observe his qubits in an uncorrelated state if he did not measure his qubits with the same basis set that Alice used to entangle her qubits. Therefore, Alice and Bob should arrange to entangle and to measure with a common basis set (e.g., along a common basis direction). Second, different entangled states impose different correlations on the constituent qubits of Bob's entanglement pair. Measuring Bob's qubits in the same or opposite basis states does not imply any correlation unless Bob knows which type of entanglement state was applied by Alice (and optionally the original entanglement state(s) of the constituent entangled groups). Third, if Alice selects to not entangle her qubits, Bob's qubits would be in a separable state, with each possible measurement outcome random. Hence, even if Bob knows the basis set and the type of entanglement, Bob's qubits may be measured in a state consistent with the entanglement correlation despite the fact that Alice did not entangle her qubits. For example, if Alice entangles her qubits (A1 and A2) to impose an anti-correlated entangled state, the probability that Bob would measure his qubits (B1 and B2) in opposite basis states ($|0\rangle$ and $|1\rangle$, or $|1\rangle$ and $|0\rangle$) is 50% each (as detailed in Table 1). If Alice does not entangle her qubits (A1 and A2), the probability that Bob would measure his qubits (B1 and B2) in any pair of basis states ($|0\rangle$ and $|0\rangle$, $|0\rangle$ and $|1\rangle$, $|1\rangle$ and $|0\rangle$, or $|1\rangle$ and $|1\rangle$) is 25% (as detailed in Table 2). Therefore, if Bob measures his qubits in the $|0\rangle$ and $|1\rangle$ states, he does not know whether or not Alice entangled her qubits, as a measurement of $|0\rangle$ and $|1\rangle$ is consistent with either scenario.

TABLE 1

| measurement probabilities of an anti-correlated entangled system (B1, B2) | | |
|---|---|---|
| B1\B2 | $|0\rangle$ | $|1\rangle$ |
| $|0\rangle$ | 0% | 50% |
| $|1\rangle$ | 50% | 0% |

TABLE 2 measurement probabilities of an
uncorrelated system (B1, B2)

| B1\B2 | |0⟩ | |1⟩ |
|---|---|---|
| |0⟩ | 25% | 25% |
| |1⟩ | 25% | 25% |

However, if Alice repeats the process of selectively entangling her qubits (A1 and A2) for each entanglement pair 76 of a set of entanglement pairs (i.e., an entanglement set 80), Bob may statistically determine whether his corresponding entanglement pairs 76 of his corresponding entanglement set 80 belong to a correlated distribution (e.g., consistent with Table 1) or an uncorrelated distribution (e.g., consistent with Table 2).

Further, Bob may classify the correlated distributions as positively correlated distributions (B1 and B2 are always measured in the same basis state) or anti-correlated distributions (negatively correlated distributions; B1 and B2 are always measured in opposite basis states, as shown in Table 1). If Alice entangles all entanglement pairs 76 of one of her entanglement sets 80 such that every entanglement pair 76 of Bob's corresponding entanglement set 80 is in a positively correlated distribution or an anti-correlated distribution, the classical bit of data Bob receives may have three values (i.e., the bit is a trit), corresponding to an uncorrelated distribution (random distribution), a positively correlated distribution, and an anti-correlated distribution.

The shared basis set for Alice's entanglement and Bob's measurement may be the same, but does not need to be the same, for each corresponding entanglement pair 76. Alice and Bob may agree to use one basis set for some corresponding entanglement-measurement operations and use another basis set for other corresponding entanglement-measurement operations. Where Alice and Bob do change the basis set during communication, the change may be periodic and/or may follow a pattern communicated between Alice and Bob.

The entanglement state of each of the entangled groups 72 may be the same or may differ among entangled groups. The entanglement states of the entangled groups 72 corresponding to an entanglement pair 76, an entanglement set 80, and/or an entanglement queue 84 may be the same or different (and/or the same or different type) within the entanglement pair 76, the entanglement set 80, and/or the entanglement queue 84.

When Alice selects to entangle each of her entanglement pairs 76 of her entanglement set 80, Alice may, but does not need to, entangle each of the entanglement pairs 76 in the same manner (i.e., imposing the same entanglement state on each). Alice may entangle her entanglement pairs 76 of an entanglement set 80 and/or an entanglement queue 84 into the same or different (and/or the same or different type of) entanglement state.

To determine the type of distribution (correlated or uncorrelated) of the entanglement pairs 76 of Bob's entanglement set 80, Bob may know, and/or receive information relating to, the entanglement state of each of the entangled groups 72 corresponding to Bob's entanglement set 80. Additionally or alternatively, Bob may know, and/or receive information indicating, that all of the entanglement states of the entangled groups 72 corresponding to Bob's entanglement set 80 and/or to any of Bob's entanglement pairs 76 are the same and/or have a defined pattern. Alice and Bob may agree to a defined protocol and/or order of entanglement states of the entangled groups before and/or during communication with the entangled qubits. Additionally or alternatively, Bob may receive a protocol and/or order of entanglement states of the entangled groups.

To determine the type of distribution (correlated or uncorrelated) of the entanglement pairs 76 of Bob's entanglement set 80, Bob may know, and/or receive information relating to, the possible entanglement state of each of Alice's entanglement pairs 76 and/or the possible entanglement state of each of Bob's entanglement pairs 76. Additionally or alternatively, Bob may know, and/or receive information indicating, that all of the possible entanglement states of Alice's entanglement pairs 76 and/or Bob's entanglement pairs 76 are the same and/or have a defined pattern. For example, Bob may expect that, if Alice entangled her entanglement pairs 76, Bob's entanglement pairs 76 should be in a given entanglement state, a given type of entanglement state, the same entanglement state each time Alice entangles her corresponding entanglement pairs 76, and/or the same type of entanglement state each time Alice entangles her corresponding entanglement pairs 76. Alice and Bob may agree to a defined protocol and/or order of entanglement states of the entanglement pairs 76 before and/or during communication with the entangled qubits 70. Additionally or alternatively, Bob may receive, and/or Alice may send, a protocol of and/or an order of entanglement states of the entanglement pairs 76.

The fidelity, or reliability, of the determination of the entanglement pair distribution increases with increasing numbers of entanglement pairs. The fidelity is the probability of correctly classifying an entangled state as entangled and a separable state as separable. The probability of misclassifying a separable state as an entangled state is the probability that the separable state will be measured in a state consistent with an entangled state. Following the example of Tables 1 and 2, a single entanglement pair in a separable state would be measured in an apparently correlated state (|0⟩ and |1⟩, or |1⟩ and |0⟩) with a net 50% probability. The corresponding fidelity (the probability of proper classification) is 50%. Hence, utilization of a single entanglement pair 76 transfers no information (consistent with the no-communication theorem).

However, utilization of more than one entanglement pair 76 in an entanglement set 80 leads to a greater fidelity and, with sufficient entanglement pairs 76, the fidelity may be made arbitrarily close to 100%. For example, the probability of misclassification of two entanglement pairs is 25% (50% of 50%), with the corresponding fidelity being 75%. The probability of misclassification is $2^{-N}$, where N is the number of entanglement pairs 76 in the entanglement set 80. The corresponding fidelity is $1-2^{-N}$. The number of entanglement pairs 76 in an entanglement set 80 may be selected for a threshold fidelity (e.g., greater than 50%, greater than 75%, or higher). For example, the number of entanglement pairs 76 may be at least 2, at least 8, at least 16, at least 24, at least 32, or at least 36.

A single classical bit of data (e.g., 0 or 1) may be sent by Alice by selectively entangling all of the entanglement pairs 76 of one of Alice's entanglement sets 80 (Alice's selected entanglement set). The value of the classical bit as received by Bob would correspond to determining a correlated distribution or an uncorrelated distribution among the corresponding entanglement pairs 76 of Bob's corresponding entanglement set 80. Alice may entangle each entanglement pair 76 of her selected entanglement set 80 to entangle every entanglement pair 76 of Bob's corresponding entanglement set 80 and thereby to produce a correlated distribution of entanglement pairs 76 in Bob's corresponding entanglement set 80. For example, Alice may perform a Bell-state measurement on each entanglement pair 76 of her selected entanglement set 80. Alice may entangle less than all of the entanglement pairs 76 of her selected entanglement set 80 to entangle less than all entanglement pairs 76 of Bob's corresponding entanglement set 80 and thereby to produce an uncorrelated distribution of entanglement pairs 76 in Bob's corresponding entanglement set 80. For example, Alice may refrain from performing a Bell-state measurement on at least one, optionally all, of the entanglement pairs 76 of her selected entanglement set 80. Alice may refrain from performing a Bell-state measurement by, e.g., doing nothing with the entanglement pair(s) or performing a separable-state measurement with the entanglement pair(s).

Before and/or during communication, Alice and Bob may desire to synchronize their mutual time so that they may coordinate sending and receiving of classical bits as disclosed. One method to synchronize the mutual time is to send a bitstream of classical bits that correspond to correlated distributions of entanglement pairs 76 in Bob's entanglement sets 80. The bitstream of classical bits may be sent by Alice substantially simultaneously at a predetermined time of the sender (Alice). Bob may begin to check his entanglement queue 84 of entanglement sets 80 that correspond to Alice's classical bits before the predetermined time (as perceived by Bob). Bob may check his entanglement sets 80 one at a time, offset by a predetermined interval(s). The initial entanglement sets 80 measured by Bob would have an uncorrelated distribution of entanglement pairs 76 because Bob would be measuring before Alice would be able to impress any entanglement on her corresponding entanglement pairs 76. Bob would observe a correlated distribution in the first determination of the distribution after Alice sent the bitstream. Alice's bitstream is sent substantially simultaneously when all of the classical bits of the bitstream are sent faster than the interval(s) between Bob's determinations of the distributions of entanglement sets. Alice and Bob may utilize this method to synchronize their mutual time at different times (e.g., once a day) and/or with different intervals (e.g., one minute for coarse synchronization, one millisecond for fine synchronization).

The communication protocol may rely on polling for a classical bit that corresponds to a correlated distribution. For this example, a classical bit that corresponds to a correlated distribution will be referred to as a logical 1 and a classical bit that corresponds to an uncorrelated distribution will be referred to as a logical 0. Polling includes sending and receiving a classical bit at one or more predetermined times (e.g., periodically sending and receiving). Alice and Bob coordinate such that Alice sends the classical bit (i.e., selectively entangles her entanglement set 80) before Bob receives the classical bit (i.e., determines the distribution of entanglement pairs 76 in Bob's corresponding entanglement set 80). The rate and/or pattern of polling may be changed while communicating.

By utilizing a polling scheme, qubits 70 and entanglement pairs 76 may be conserved for another message. As disclosed, each qubit 70 only may be utilized once. After measurement, the qubits 70 are no longer entangled and no longer in a superposition state. The communication devices 12 may have a limited supply and/or may have a slowly replenished supply of qubits 70 and entanglement pairs 76. Hence, conservation of qubits 70 and entanglement pairs 76 may be desirable.

When Alice sends a logical 1 and Bob receives the logical 1, Alice and Bob may agree to transmit a message that comprises a message payload and an optional length field. The message comprises a bitstream of classical bits. The message may begin with the optional length field, which encodes the length of the message and/or the message payload. The message payload includes a bitstream of classical bits that encode the desired message.

Other message protocols may include sending and receiving a bitstream of classical bits at one or more predetermined times. The bitstream may have a predefined length or the bitstream may include a length field. The bitstream also may include a message payload.

Examples of inventive subject matter according to the present disclosure are described in the following enumerated paragraphs.

A1. A method of communicating a classical bit, the method comprising:
 forming an entanglement set of at least two entanglement pairs and a corresponding entanglement set of at least two corresponding entanglement pairs, wherein each entanglement pair and corresponding entanglement pair are formed together by:
  forming a first entangled group by entangling a first qubit and a second qubit;
  forming a second entangled group by entangling a third qubit and a fourth qubit;
  locating the first qubit and the third qubit in a first location to form the entanglement pair; and
  locating the second qubit and the fourth qubit in a second location to form the corresponding entanglement pair.

A2. The method of paragraph A1, further comprising:
 sending a classical bit from the first location to the second location by one of
  (a) entangling each entanglement pair of the entanglement set to produce a correlated distribution in the corresponding entanglement set in which every corresponding entanglement pair of the corresponding entanglement set is entangled, or
  (b) entangling less than all of the entanglement pairs of the entanglement set to produce an uncorrelated distribution in the corresponding entanglement set in which less than all corresponding entanglement pairs of the corresponding entanglement set are entangled;
 wherein the classical bit has one of two binary values that correspond to the correlated distribution and the uncorrelated distribution.

A2.1. The method of paragraph A2, wherein the (a) entangling includes performing a joint entanglement measurement on each entanglement pair of the entanglement set, and optionally wherein the joint entanglement measurement is at least one of a Bell-state measurement or a complete Bell-state measurement.

A2.2. The method of any of paragraphs A2-A2.1, wherein the (a) entangling includes projecting all entanglement pairs of the entanglement set onto projected entangled states.

A2.2.1. The method of paragraph A2.2, wherein each projected entangled state is an identical entangled state.

A2.2.2. The method of any of paragraphs A2.2-A2.2.1, wherein the projected entangled states of the entanglement pairs include a first entangled state and a second entangled state that is different from the first entangled state.

A2.2.3. The method of any of paragraphs A2.2-A2.2.2, wherein all of the projected entangled states are one of all positively-correlated entangled states or all anti-correlated entangled states.

A2.2.4. The method of any of paragraphs A2.2-A2.2.3, wherein each projected entangled state independently is one of a positively-correlated entangled state or an anti-correlated entangled state.

A2.2.5. The method of any of paragraphs A2.2-A2.2.4, wherein the projected entangled state is a Bell state.

A2.3. The method of any of paragraphs A2-A2.2.5, wherein the (b) entangling includes performing a separable-state measurement on at least one, optionally each, of the entanglement pairs of the entanglement set.

A2.4. The method of any of paragraphs A2-A2.3, wherein the (b) entangling includes projecting at least one, optionally each, of the entanglement pairs of the entanglement set onto a separable state.

A2.5. The method of any of paragraphs A2-A2.4, further comprising repeating, optionally periodically repeating, the forming an entanglement set and corresponding entanglement set, and the sending a classical bit, optionally to produce a digital message with a bitstream of classical bits.

A2.5.1. The method of paragraph A2.5, wherein the repeating includes forming an entanglement queue of entanglement sets in the first location and a corresponding entanglement queue of corresponding entanglement sets in the second location.

A2.5.1.1. The method of paragraph A2.5.1, wherein the entanglement queue and the corresponding entanglement queue have an order, wherein the sending a classical bit is performed with each entanglement set of the entanglement queue in the order of the entanglement queue.

A2.5.1.2. The method of any of paragraphs A2.5.1-A2.5.1.1, wherein each entanglement set of the entanglement queue has a given number of entanglement pairs and wherein each corresponding entanglement set of the corresponding entanglement queue has a number of corresponding entanglement pairs that is equal to the given number.

A2.5.1.3. The method of any of paragraphs A2.5.1-A2.5.1.1, wherein the entanglement queue includes a first entanglement set with a first number of entanglement pairs and a second entanglement set with a second number of entanglement pairs, wherein the corresponding entanglement queue includes a first corresponding entanglement set with the first number of entanglement pairs and a second corresponding entanglement set with the second number of entanglement pairs, and wherein the first number is different than the second number.

A2.5.2. The method of any of paragraphs A2.5-A2.5.1.3, wherein the digital message has a predetermined length of bits.

A2.5.3. The method of any of paragraphs A2.5-A2.5.2, wherein the digital message includes a field indicating a length of the digital message.

A2.5.4. The method of any of paragraphs A2.5-A2.5.3, wherein the digital message includes a field indicating a time until a future transmission.

A2.5.5. The method of any of paragraphs A2.5-A2.5.4, wherein the digital message includes a field indicating a fidelity of a future transmission, optionally wherein the fidelity is related to a number of entanglement pairs in a queued entanglement set for a future transmission.

A2.5.6. The method of any of paragraphs A2.5-A2.5.5, wherein the method includes sending a first classical bit with a binary value corresponding to the correlated distribution before the repeating to produce a digital message with a bitstream of classical bits.

A2.5.7. The method of any of paragraphs A2.5-A2.5.6, wherein the repeating the sending includes sending classical bits at predetermined times.

A3. The method of any of paragraphs A1-A2.5.7, further comprising:
receiving a classical bit from the first location at the second location by one of
(a) determining that each corresponding entanglement pair of the corresponding entanglement set is in a possible entangled state to identify a correlated distribution in the corresponding entanglement set, or
(b) determining that at least one, optionally each, of the corresponding entanglement pairs of the corresponding entanglement set is in a separable state to identify an uncorrelated distribution in the corresponding entanglement set;
wherein the classical bit has one of two binary values that correspond to the correlated distribution and the uncorrelated distribution.

A3.1. The method of paragraph A3, wherein the receiving includes determining a probability that all corresponding entanglement pairs of the corresponding entanglement set are in entangled states, optionally wherein the correlated distribution corresponds to the probability being greater than a predetermined threshold and the uncorrelated distribution corresponds to the probability being less than or equal to the predetermined threshold.

A3.1.1. The method of paragraph A3.1, wherein the predetermined threshold is one of 50%, 75%, greater than 50%, or greater than 75%.

A3.1.2. The method of any of paragraphs A3.1-A3.1.1, wherein the predetermined threshold is $1-2^{-(N-1)}$, wherein N is a number of corresponding entanglement pairs in the corresponding entanglement set.

A3.2. The method of any of paragraphs A3-A3.1.2, wherein the receiving includes performing a separable-state measurement on at least one, optionally each, corresponding entanglement pair of the corresponding entanglement set.

A3.3. The method of any of paragraphs A3-A3.2, wherein the receiving includes performing a separable-state measurement on corresponding entanglement pairs of the corresponding entanglement set until at least one of (a) all corresponding entanglement pairs of the corresponding entanglement set have been measured or (b) one corresponding entanglement pair of the corresponding entanglement set is measured in the separable state.

A3.4. The method of any of paragraphs A3-A3.3, when also depending from paragraph A2, wherein the receiving is after the sending.

A3.5. The method of any of paragraphs A3-A3.4, further comprising repeating, optionally periodically repeating, the forming an entanglement set and corresponding entanglement set, and the receiving a classical bit, optionally to receive a digital message including a bitstream of classical bits.

A3.5.1. The method of paragraph A3.5, wherein the repeating includes forming an entanglement queue of entanglement sets in the first location and a corresponding entanglement queue of corresponding entanglement sets in the second location.

A3.5.1.1. The method of paragraph A3.5.1, wherein the entanglement queue and the corresponding entanglement queue have an order, wherein the receiving a classical bit is performed with each corresponding entanglement set of the corresponding entanglement queue in the order of the corresponding entanglement queue.

A3.5.1.2. The method of any of paragraphs A3.5.1-A3.5.1.1, wherein each entanglement set of the entanglement queue has a given number of entanglement pairs and wherein each corresponding entanglement set of the corresponding entanglement queue has a number of corresponding entanglement pairs that is equal to the given number.

A3.5.1.3. The method of any of paragraphs A3.5.1-A3.5.1.1, wherein the entanglement queue includes a first entanglement set with a first number of entanglement pairs and a second entanglement set with a second number of entanglement pairs, wherein the corresponding entanglement queue includes a first corresponding entanglement set with the first number of entanglement pairs and a second corresponding entanglement set with the second number of entanglement pairs, and wherein the first number is different than the second number.

A3.5.2. The method of any of paragraphs A3.5-A3.5.1.3, wherein the repeating the receiving includes receiving classical bits at predetermined times.

A4. The method of any of paragraphs A1-A3.5.2, wherein the first qubit, the second qubit, the third qubit, and/or the fourth qubit is a quantum system that includes at least one of a boson, a fermion, a photon, an electron, an ion, an atom, a molecule, a quasiparticle, an exciton, a plasmon, or a quantum dot.

A5. The method of any of paragraphs A1-A4, wherein the first qubit, the second qubit, the third qubit, and/or the fourth qubit is based on at least one of polarization of a photon, orbital angular momentum of a photon, presence of a photon, spin of an electron, presence of an electron, or a two-state parameter of a quantum system.

A6. The method of any of paragraphs A1-A5, wherein the forming the first entangled group includes at least one of (a) generating the first qubit and the second qubit in a first entangled state or (b) projecting the first qubit and the second qubit onto the first entangled state.

A6.1. The method of paragraph A6, when also depending from paragraph A2, wherein the (a) entangling includes projecting each entanglement pair of the entanglement set onto the first entangled state.

A7. The method of any of paragraphs A1-A6.1, wherein the forming the second entangled group includes at least one of (a) generating the third qubit and the fourth qubit in a second entangled state or (b) projecting the third qubit and the fourth qubit onto the second entangled state.

A7.1. The method of paragraph A7, when also depending from paragraph A6, wherein the first entangled state is identical to the second entangled state.

A7.2. The method of any of paragraphs A7-A7.1, when also depending from paragraph A2, wherein the (a) entangling includes projecting each entanglement pair of the entanglement set onto the second entangled state.

A8. The method of any of paragraphs A1-A7.2, wherein the forming the entanglement set and the corresponding entanglement set includes forming the entanglement set with a given number of entanglement pairs and the corresponding entanglement set with a number of corresponding entanglement pairs that is equal to the given number, wherein the given number is at least 8, at least 16, at least 24, at least 32, or at least 36.

A9. The method of any of paragraphs A1-A8, when also depending from paragraph A3, further comprising:
repeating the forming an entanglement set and a corresponding entanglement set to form an entanglement queue of entanglement sets in the first location and a corresponding entanglement queue of corresponding entanglement sets in the second location;
polling for a classical bit corresponding to the correlated distribution by repeating the receiving at a sequence of receive times;
sending from the first location to the second location, at a predetermined send time during the polling, a bitstream of classical bits corresponding to the correlated distribution by entangling each entanglement pair of each entanglement set of the entanglement queue to produce the correlated distribution in the corresponding entanglement sets of the corresponding entanglement queue in which every corresponding entanglement pair of every corresponding entanglement set is entangled; and
determining a time offset between the first location and the second location by comparing the predetermined send time with the receive time that corresponds to first receiving a classical bit corresponding to the correlated distribution.

A10. The method of any of paragraphs A1-A9, wherein the method is a method of time synchronization.

A11. The method of any of paragraphs A1-A10, wherein the polling includes repeating the receiving for each corresponding entanglement set in the corresponding entanglement queue.

A12. The method of any of paragraphs A1-A11, wherein the polling includes repeating until receiving a classical bit corresponding to the correlated distribution.

A13. The method of any of paragraphs A1-A12, further comprising adjusting a local time at the second location based upon the time offset.

B1. A method of digitally communicating between a sending device and a receiving device, wherein each of the sending device and the receiving device includes an entanglement set of entanglement pairs of qubits, wherein each qubit of the sending device is entangled with a corresponding qubit of the receiving device, the method comprising:
sending a classical bit from the sending device to the receiving device by one of
(a) entangling each entanglement pair of the entanglement set of the sending device to produce a correlated distribution in the entanglement set of the sending device in which every entanglement pair of the entanglement set of the receiving device is entangled, or
(b) entangling less than all of the entanglement pairs of the entanglement set of the sending device to produce an uncorrelated distribution in the entanglement set of the receiving device in which less than all entanglement pairs of the entanglement set of the receiving device are entangled;
wherein the classical bit has one of two binary values that correspond to the correlated distribution and the uncorrelated distribution.

B2. The method of paragraph B1, wherein the (a) entangling includes performing a joint entanglement measurement on each entanglement pair of the entanglement set of the sending device, and optionally wherein the joint entanglement measurement is at least one of a Bell-state measurement or a complete Bell-state measurement.

B3. The method of any of paragraphs B1-B2, wherein the (a) entangling includes projecting each entanglement pair of the entanglement set of the sending device onto a projected entangled state.

B3.1. The method of paragraph B3, wherein each projected entangled state is an identical entangled state.

B3.2. The method of any of paragraphs B3-B3.1, wherein the projected entangled states include a first entangled state and a second entangled state that is different from the first entangled state.

B3.3. The method of any of paragraphs B3-B3.2, wherein all of the projected entangled states are one of all positively-correlated entangled states or all anti-correlated entangled states.

B3.4. The method of any of paragraphs B3-B3.3, wherein each projected entangled state independently is one of a positively-correlated entangled state or an anti-correlated entangled state.

B3.5. The method of any of paragraphs B3-B3.4, wherein the projected entangled state is a Bell state.

B4. The method of any of paragraphs B1-B3.5, wherein the (b) entangling includes performing a separable-state measurement on at least one, optionally each, of the entanglement pairs of the entanglement set of the sending device.

B5. The method of any of paragraphs B1-B4, wherein the (b) entangling includes projecting at least one, optionally each, of the entanglement pairs of the entanglement set of the sending device onto a separable state.

B6. The method of any of paragraphs B1-B5, further comprising repeating, optionally periodically repeating, the sending to produce a digital message with a bitstream of classical bits.

B6.1. The method of paragraph B6, wherein each of the sending device and the receiving device includes an entanglement queue of entanglement sets, wherein the entanglement queue of the sending device and the entanglement queue of the receiving device have a common order of entanglement sets, wherein repeating includes performing the sending for each entanglement set of the entanglement queue of the sending device in the common order.

B6.1.1. The method of paragraph B6.1, wherein each entanglement set of the entanglement queue of the sending device has a given number of entanglement pairs and wherein each entanglement set of the entanglement queue of the receiving device has the given number of entanglement pairs.

B6.1.2. The method of paragraph B6.1, wherein the entanglement queue of the sending device includes a first entanglement set with a first number of entanglement pairs and a second entanglement set with a second number of entanglement pairs, wherein the entanglement queue of the receiving device includes a first entanglement set with the first number of entanglement pairs and a second entanglement set with the second number of entanglement pairs, and wherein the first number is different than the second number.

B6.2. The method of any of paragraphs B6-B6.1.2, wherein the digital message has a predetermined length of bits.

B6.3. The method of any of paragraphs B6-B6.2, wherein the digital message includes a field indicating a length of the digital message.

B6.4. The method of any of paragraphs B6-B6.3, wherein the digital message includes a field indicating a time until a future transmission.

B6.5. The method of any of paragraphs B6-B6.4, wherein the digital message includes a field indicating a fidelity of a future transmission, optionally wherein the fidelity is related to a number of entanglement pairs in a queued entanglement set for a future transmission.

B6.6. The method of any of paragraphs B6-B6.5, wherein the method includes sending a first classical bit with a binary value corresponding to the correlated distribution before the repeating to produce a digital message with a bitstream of classical bits.

B6.7. The method of any of paragraphs B6-B6.6, wherein the repeating the sending includes sending classical bits at predetermined times.

B7. The method of any of paragraphs B1-B6.7, wherein each qubit and/or each corresponding qubit is a quantum system that includes at least one of a boson, a fermion, a photon, an electron, an ion, an atom, a molecule, a quasi-particle, an exciton, a plasmon, or a quantum dot.

B8. The method of any of paragraphs B1-B7, wherein each qubit and/or each corresponding qubit is based on at least one of polarization of a photon, orbital angular momentum of a photon, presence of a photon, spin of an electron, presence of an electron, or a two-state parameter of a quantum system.

B9. The method of any of paragraphs B1-B8, wherein the entanglement set of the sending device and the entanglement set of the receiving device each include at least 2, at least 8, at least 16, at least 24, at least 32, or at least 36 entanglement pairs.

B10. The method of any of paragraphs B1-B9, wherein each qubit of the sending device and corresponding qubit of the receiving device together form an entangled group, and wherein each entangled group is in an identical entangled state.

B10.1. The method of paragraph B10, wherein the (a) entangling includes projecting each entanglement pair of the entanglement set of the sending device onto the identical entangled state.

B11. The method of any of paragraphs B1-B10.1, wherein each qubit of the sending device and corresponding qubit of the receiving device together form an entangled group, and wherein each entangled group is in a maximally entangled state.

C1. A method of digitally communicating between a sending device and a receiving device, wherein each of the sending device and the receiving device includes an entanglement set of entanglement pairs of qubits, wherein each qubit of the sending device is entangled with a corresponding qubit of the receiving device, the method comprising:
  receiving a classical bit at the receiving device from the sending device by one of
    (a) determining that each entanglement pair of the entanglement set of the receiving device is in a possible entangled state to identify a correlated distribution in the entanglement set of the receiving device, or
    (b) determining that at least one of the entanglement pairs of the entanglement set of the receiving device is in a separable state to identify an uncorrelated distribution in the entanglement set of the receiving device;
  wherein the classical bit has one of two binary values that correspond to the correlated distribution and the uncorrelated distribution.

C1.1. The method of paragraph C1, further comprising any of the methods of any of paragraphs B1-B11.

C1.1.1. The method of paragraph C1.1, wherein a number of entanglement pairs in the entanglement set of the sending device equals a number of entanglement pairs in the entanglement set of the receiving device.

C2. The method of any of paragraphs C1-C1.1.1, wherein the receiving includes determining a probability that all entanglement pairs of the entanglement set of the receiving device are in entangled states, optionally wherein the correlated distribution corresponds to the probability being greater than a predetermined threshold and the uncorrelated distribution corresponds to the probability being less than or equal to the predetermined threshold.

C2.1. The method of paragraph C2, wherein the predetermined threshold is one of 50%, 75%, greater 50%, or greater than 75%.

C2.2. The method of any of paragraphs C2-C2.1, wherein the predetermined threshold is $1-2^{-(N-1)}$, wherein N is a number of entanglement pairs in the entanglement set of the receiving device, and optionally wherein N is at least 2, at least 8, at least 16, at least 24, at least 32, or at least 36.

C3. The method of any of paragraphs C1-C2.2, wherein the receiving includes performing a separable-state measurement on at least one, optionally each, entanglement pair of the entanglement set of the receiving device.

C4. The method of any of paragraphs C1-C3, wherein the receiving includes performing a separable-state measurement on entanglement pairs of the entanglement set of the receiving device until at least one of (a) all entanglement pairs of the entanglement set of the receiving device have been measured or (b) one entanglement pair of the entanglement set of the receiving device is measured in the separable state.

C5. The method of any of paragraphs C1-C4, when also depending from paragraph C1.1, wherein the receiving is after the sending.

C6. The method of any of paragraphs C1-05, further comprising repeating, optionally periodically repeating, the receiving to receive a digital message with a bitstream of classical bits.

C6.1. The method of paragraph C6, wherein each of the sending device and the receiving device includes an entanglement queue of entanglement sets, wherein the entanglement queue of the sending device and the entanglement queue of the receiving device have a common order of entanglement sets, wherein the repeating includes performing the receiving for each entanglement set of the entanglement queue of the receiving device in the common order.

C6.1.1. The method of paragraph C6.1, wherein each entanglement set of the entanglement queue of the sending device has a given number of entanglement pairs and wherein each entanglement set of the entanglement queue of the receiving device has the given number of entanglement pairs.

C6.1.2. The method of paragraph C6.1, wherein the entanglement queue of the sending device includes a first entanglement set with a first number of entanglement pairs and a second entanglement set with a second number of entanglement pairs, wherein the entanglement queue of the receiving device includes a first entanglement set with the first number of entanglement pairs and a second entanglement set with the second number of entanglement pairs, and wherein the first number is different than the second number.

C6.2. The method of any of paragraphs C6-C6.1.2, wherein the digital message has a predetermined length of bits.

C6.3. The method of any of paragraphs C6-C6.2, wherein the digital message includes a field indicating a length of the digital message.

C6.4. The method of any of paragraphs C6-C6.3, wherein the digital message includes a field indicating a time until a future transmission.

C6.5. The method of any of paragraphs C6-C6.4, wherein the digital message includes a field indicating a fidelity of a future transmission, optionally wherein the fidelity is related to a number of entanglement pairs in a queued entanglement set for a future transmission.

C6.6. The method of any of paragraphs C6-C6.5, wherein the repeating the receiving includes receiving classical bits at predetermined times.

C7. The method of any of paragraphs C1-C6.6, wherein each qubit and/or each corresponding qubit is a quantum system that includes at least one of a boson, a fermion, a photon, an electron, an ion, an atom, a molecule, a quasi-particle, an exciton, a plasmon, or a quantum dot.

C8. The method of any of paragraphs C1-C7, wherein each qubit and/or each corresponding qubit is based on at least one of polarization of a photon, orbital angular momentum of a photon, presence of a photon, spin of an electron, presence of an electron, or a two-state parameter of a quantum system.

C9. The method of any of paragraphs C1-C8, wherein the entanglement set of the sending device and the entanglement set of the receiving device each include at least 2, at least 8, at least 16, at least 24, at least 32, or at least 36 entanglement pairs.

C10. The method of any of paragraphs C1-C9, wherein each qubit of the sending device and corresponding qubit of the receiving device together form an entangled group, and wherein each entangled group is in an identical entangled state.

C11. The method of any of paragraphs C1-C10, wherein each qubit of the sending device and corresponding qubit of the receiving device together form an entangled group, and wherein each entangled group is in a maximally entangled state.

D1. A method of time synchronization between a sending device at a sending location and a receiving device at a receiving location, wherein each of the sending device and the receiving device includes an entanglement queue of entanglement sets of entanglement pairs of qubits, wherein each qubit of the sending device is entangled with a corresponding qubit of the receiving device, the method comprising:

polling by the receiving device for a marker classical bit corresponding to a correlated distribution by sequentially checking the entanglement sets of the entanglement queue of the receiving device at least until identifying the marker classical bit, wherein, for each entanglement set of the entanglement queue of the receiving device that is checked, the checking includes one of
 (a) determining that each entanglement pair of the entanglement set checked is in a possible entangled state to identify the correlated distribution in the entanglement set checked and to identify the marker classical bit, or
 (b) determining that at least one, optionally each, of the entanglement pairs of the entanglement set checked is in a separable state to identify an uncorrelated distribution in the entanglement set checked;

sending from the sending device to the receiving device, at a predetermined local send time during the polling, a bitstream of classical bits, each classical bit corresponding to the correlated distribution in one of the entanglement sets of the entanglement queue of the sending device, by entangling each entanglement pair of each entanglement set of the entanglement queue of the sending device to produce the correlated distribution in each of the entanglement sets of the entanglement queue of the receiving device; and determining a time offset between the sending location and the receiving location by comparing the local send time with a local receive time that corresponds to first receiving the marker classical bit at the receiving device.

D2. The method of paragraph D1, further comprising determining the local receive time that corresponds to first receiving the marker classical bit at the receiving device.

D3. The method of any of paragraphs D1-D2, further comprising adjusting a local time of the receiving device based upon the time offset.

D4. The method of any of paragraphs D1-D3, wherein the polling includes sequentially checking all of the entanglement sets of the entanglement queue.

D5. The method of any of paragraphs D1-D4, wherein the sending includes sending the bitstream substantially simultaneously.

D6. The method of any of paragraphs D1-D5, wherein the polling includes checking the entanglement sets of the entanglement queue of the receiving device one at a time, offset by a predetermined interval, optionally wherein the interval is at least 1 millisecond, at least 1 second, at least 1 minute, less than 1 hour, and/or less than 1 minute.

D7. The method of any of paragraphs D1-D6, wherein each qubit and/or each corresponding qubit is a quantum system that includes at least one of a boson, a fermion, a photon, an electron, an ion, an atom, a molecule, a quasi-particle, an exciton, a plasmon, or a quantum dot.

D8. The method of any of paragraphs D1-D7, wherein each qubit and/or each corresponding qubit is based on at least one of polarization of a photon, orbital angular momentum of a photon, presence of a photon, spin of an electron, presence of an electron, or a two-state parameter of a quantum system.

D9. The method of any of paragraphs D1-D8, wherein each of the entanglement sets of the sending device and each of the entanglement sets of the receiving device each include at least 2, at least 8, at least 16, at least 24, at least 32, or at least 36 entanglement pairs.

D10. The method of any of paragraphs D1-D9, wherein each qubit of the sending device and corresponding qubit of the receiving device together form an entangled group, and wherein each entangled group is in an identical entangled state.

D10.1. The method of paragraph D10, wherein the entangling each entanglement pair of each entanglement set of the entanglement queue of the sending device includes projecting each entanglement pair of each entanglement set of the entanglement queue of the sending device onto the identical entangled state.

D11. The method of any of paragraphs D1-D10.1, wherein each qubit of the sending device and corresponding qubit of the receiving device together form an entangled group, and wherein each entangled group is in a maximally entangled state.

D12. The method of any of paragraphs D1-D11, further comprising the method of any of paragraphs A1-A13, B1-B11, and/or C1-C11.

E1. A sending device for communicating with a receiving device comprising:

an entanglement queue of entanglement sets of entanglement pairs of qubits, wherein each qubit of the sending device is entangled with a corresponding qubit of the receiving device;

wherein the sending device is configured to send a digital message to the receiving device by encoding a plurality of classical bits of data into the entanglement sets of the sending device, wherein each classical bit is encoded by one entanglement set of the entanglement queue, and wherein each classical bit is encoded as one of (a) a correlated distribution of entanglement pairs in the one entanglement set formed by entangling each entanglement pair of the one entanglement set, or (b) an uncorrelated distribution of entanglement pairs in the one entanglement set formed by entangling less than all of the entanglement pairs of the one entanglement set.

E2. The sending device of paragraph E1, wherein the sending device is configured, for each entanglement set of the entanglement queue, to selectively entangle all of the entanglement pairs of the entanglement set to encode the classical bit.

E3. The sending device of any of paragraphs E1-E2, wherein the sending device is configured to perform any of the methods of paragraphs A1-A13, B1-B11, and/or D1-012.

F1. A receiving device for receiving communication from a sending device comprising:

an entanglement queue of entanglement sets of entanglement pairs of qubits, wherein each qubit of the receiving device is entangled with a corresponding qubit of the sending device;

wherein the receiving device is configured to receive a digital message from the sending device by decoding a plurality of classical bits of data from the entanglement sets of the receiving device, wherein each classical bit is decoded from one entanglement set of the entanglement queue, and wherein each classical bit is decoded by one of (a) determining that each entanglement pair of the one entanglement set is in a possible entangled state to identify a correlated distribution in the one entanglement set and to assign a first binary value to the classical bit, or (b) determining that at least one of the entanglement pairs of the one entanglement set is in a separable state to identify an uncorrelated distribution in the one entanglement set and to assign a second binary value to the classical bit.

F2. The receiving device of paragraph F1, wherein the receiving device is configured to perform any of the methods of paragraphs A1-A13, C1-C11, and/or D1-D12.

G1. A communication system comprising:

at least one sending device of any of paragraphs E1-E3; and at least one receiving device of any of paragraphs F1-F2.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, mean any one or more of the entities in the list of entities, and are not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B. As used herein, the phrase "one of . . . or . . . " indicates an exclusive disjunctive list. For example, "one of A or B" may refer to either A alone or B alone, but not the combination of A and B.

The invention claimed is:

1. A method of digitally communicating between a sending device and a receiving device, wherein each of the sending device and the receiving device includes an entanglement queue of entanglement sets of entanglement pairs of qubits, wherein the entanglement sets include marker entanglement sets and message entanglement sets, wherein each qubit of the sending device is entangled with a corresponding qubit of the receiving device, the method comprising:

sending a marker bit from the sending device to the receiving device by one of entangling each entanglement pair of one of the marker entanglement sets of the sending device into an identical marker-bit entangled state to produce a correlated distribution in one of the marker entanglement sets of the receiving device in which every entanglement pair of the one of the marker entanglement sets of the receiving device is entangled, or entangling less than all of the entanglement pairs of the one of the marker entanglement sets of the sending device into the identical marker-bit entangled state to produce an uncorrelated distribution in the one of the marker entanglement sets of the receiving device in which less than all entanglement pairs of the one of the marker entanglement sets of the receiving device are entangled in the identical marker-bit entangled state; and for each marker bit that corresponds to the correlated distribution in the marker entanglement set of the sending device, sending a message of bits from the sending device to the receiving device by one of, independently for each bit of the message of bits, entangling each entanglement pair of one of the message entanglement sets of the sending device into an identical message-bit entangled state to produce the correlated distribution in one of the message entanglement sets of the receiving device in which every entanglement pair of the one of the message entanglement sets of the receiving device is entangled, or entangling less than all of the entanglement pairs of the one of the message entanglement sets of the sending device into the identical message-bit entangled state to produce the uncorrelated distribution in the one of the message entanglement sets of the receiving device in which less than all entanglement pairs of the one of the message entanglement sets of the receiving device are entangled in the identical message-bit entangled state.

2. The method of claim 1, wherein the marker-bit entangled state is a positively-correlated entangled state.

3. The method of claim 1, wherein the marker-bit entangled state is an anti-correlated entangled state.

4. The method of claim 1, wherein the message-bit entangled state is a positively-correlated entangled state.

5. The method of claim 1, wherein the message-bit entangled state is an anti-correlated entangled state.

6. The method of claim 1, wherein the entangling less than all of the entanglement pairs of the one of the marker entanglement sets includes projecting each of the entanglement pairs of the one of the marker entanglement sets onto a separable state.

7. The method of claim 1, wherein the entangling less than all of the entanglement pairs of the one of the marker entanglement sets includes projecting one of the entanglement pairs of the marker entanglement sets onto a positively-correlated entangled state and projecting another one of the entanglement pairs of the one of the marker entanglement sets onto an anti-correlated entangled state.

8. The method of claim 1, wherein the entangling less than all of the entanglement pairs of the one of the message entanglement sets includes projecting each of the entanglement pairs of the one of the message entanglement sets onto a separable state.

9. The method of claim 1, wherein the entangling less than all of the entanglement pairs of the one of the message entanglement sets includes projecting one of the entanglement pairs of the message entanglement sets onto a positively-correlated entangled state and projecting another one of the entanglement pairs of the one of the message entanglement sets onto an anti-correlated entangled state.

10. The method of claim 1, wherein the entangling each entanglement pair of one of the marker entanglement sets includes performing a complete Bell-state measurement on each entanglement pair of the one of the marker entanglement sets.

11. The method of claim 1, wherein the entangling each entanglement pair of one of the message entanglement sets includes performing a complete Bell-state measurement on each entanglement pair of the one of the message entanglement sets.

12. A method of digitally communicating between a sending device and a receiving device, wherein each of the sending device and the receiving device includes an entanglement queue of entanglement sets of entanglement pairs of qubits, wherein the entanglement sets include marker entanglement sets and message entanglement sets, wherein each qubit of the sending device is entangled with a corresponding qubit of the receiving device, the method comprising:
  receiving a marker bit at the receiving device from the sending device by one of
    determining that each entanglement pair of one of the marker entanglement sets of the receiving device is in an identical marker-bit correlated state to identify a correlated distribution in the one of the marker entanglement sets of the receiving device, or
    determining that less than all of the entanglement pairs of the one of the marker entanglement sets of the receiving device are in the identical marker-bit correlated state to identify an uncorrelated distribution in the one of the marker entanglement sets of the receiving device; and
  for each marker bit that corresponds to the correlated distribution in the marker entanglement set of the receiving device, receiving a message of bits at the receiving device from the sending device by one of, independently for each bit of the message of bits,
    determining that each entanglement pair of one of the message entanglement sets of the receiving device is in an identical message-bit correlated state to identify the correlated distribution in the one of the message entanglement sets of the receiving device, or
    determining that less than all of the entanglement pairs of the one of the message entanglement sets of the receiving device are in the identical message-bit correlated state to identify the uncorrelated distribution in the one of the message entanglement sets of the receiving device.

13. The method of claim 12, wherein the receiving the marker bit includes determining a probability that all entanglement pairs of the one of the marker entanglement sets of the receiving device are in entangled states, wherein the correlated distribution corresponds to the probability being greater than a predetermined threshold and the uncorrelated distribution corresponds to the probability being less than or equal to the predetermined threshold.

14. The method of claim 13, wherein the predetermined threshold is $1-2-(N-1)$, wherein N is a number of entanglement pairs in the one of the marker entanglement sets of the receiving device.

15. The method of claim 12, wherein the receiving the message of bits includes determining a probability that all entanglement pairs of the one of the message entanglement sets of the receiving device are in entangled states, wherein the correlated distribution corresponds to the probability being greater than a predetermined threshold and the uncorrelated distribution corresponds to the probability being less than or equal to the predetermined threshold.

16. The method of claim 15, wherein the predetermined threshold is $1-2-(N-1)$, wherein N is a number of entanglement pairs in the one of the message entanglement sets of the receiving device.

17. The method of claim 12, wherein the receiving the marker bit includes performing a separable-state measurement on at least one entanglement pair of the one of the marker entanglement sets of the receiving device.

18. The method of claim 12, wherein the receiving the message of bits includes performing a separable-state measurement on at least one entanglement pair of the one of the message entanglement sets of the receiving device.

19. The method of claim 12, wherein the receiving the marker bit includes performing a separable-state measurement on entanglement pairs of the one of the marker entanglement sets of the receiving device until at least one of (a) all entanglement pairs of the one of the marker entanglement sets of the receiving device have been measured or (b) one entanglement pair of the one of the marker entanglement sets of the receiving device is measured in a separable state.

20. The method of claim 12, wherein the receiving the message of bits includes performing a separable-state measurement on entanglement pairs of the one of the message entanglement sets of the receiving device until at least one of (a) all entanglement pairs of the one of the message entanglement sets of the receiving device have been measured or (b) one entanglement pair of the one of the message entanglement sets of the receiving device is measured in a separable state.

* * * * *